United States Patent

Matsuzaki et al.

[11] Patent Number: 5,987,165
[45] Date of Patent: Nov. 16, 1999

[54] IMAGE PROCESSING SYSTEM

[75] Inventors: Tomoyasu Matsuzaki; Yoshiharu Hibi; Toshio Yamazaki; Noriyuki Kurabayashi; Takahide Inoue, all of Ebina, Japan

[73] Assignee: Fuji Xerox Co., Ltd., Tokyo, Japan

[21] Appl. No.: 08/706,249

[22] Filed: Sep. 4, 1996

[30] Foreign Application Priority Data

Sep. 4, 1995 [JP] Japan ................................. 7-226624
Aug. 8, 1996 [JP] Japan ................................. 8-210124

[51] Int. Cl.$^6$ ................................................. G06K 9/00
[52] U.S. Cl. ............................................ 382/162; 382/167
[58] Field of Search .............................. 382/162, 167; 358/518, 523

[56] References Cited

U.S. PATENT DOCUMENTS 5,604,610 2/1997 Spaulding et al. ....................... 358/525

FOREIGN PATENT DOCUMENTS 6-502055 3/1994 Japan .

*Primary Examiner*—Phuoc Tran
*Attorney, Agent, or Firm*—Oliff & Berridge, PLC

[57] ABSTRACT

An original image 402, conversion images 404a–404c provided by executing gamut compression systems, and a mix percentage scale 406 are displayed on a display. The user can click on any one of the conversion images 404a–404c for specifying a user-adjusted image 403. Further, when the user clicks on the mix percentage scale 406, the conversion images 404a–404c are mixed in response to the point on which the user clicks (point 406p), and the result is specified as the user-adjusted image 403.

23 Claims, 18 Drawing Sheets

——— INPUT GAMUT

- - - - OUTPUT GAMUT

IMAGE PROCESSING SYSTEM

BACKGROUND OF THE INVENTION

1. Field of the Invention

This invention relates to a preferred image processing system and a preferred gamut adjustment method used for gamut adjustments of copiers, printers, and image output devices.

2. Description of the Related Art

Image output devices of displays, printers, etc., include a reproducible color range (gamut). Generally, the gamut of a printer is narrower than that of a display. Therefore, if the user makes color adjustments while seeing an image displayed on a display and obtains a satisfactory image, when the image data is output to a printer as it is, the intended output image may not be provided.

To output an image by using a device with a narrow gamut, generally image data is previously compressed within the gamut of the output device (gamut compression). Various gamut compression systems are known. The main three systems will be discussed with reference to FIGS. 10A to 10C.

(a) Common area storage type (calorimetric match)

FIGS. 10A shows L*a*b* space, wherein narrow area GOUT surrounding origin O. The area surrounding the output gamut GOUT is the gamut of original image data (before gamut adjustment). In the common area storage type, colors in the common area to input and output gamuts GIN and GOUT are stored as they are. In the example shown in the figure, all area of the output gamut GOUT is contained in the input gamut GIN, thus if colors in input image data are contained in the output gamut GOUT, a color adjustment is not made to the colors.

On the other hand, if colors in input image data are outside the range of the output gamut GOUT, they are moved as indicated by arrows in the figure. That is, the colors are moved toward a direction orthogonal to a lightness axis (L* axis) and are replaced with outermost colors in the output gamut GOUT (boundary colors).

Since the lightness is stored, the system is appropriate for applications where accuracy of lightness is required, such as reproduction of corporate color. On the other hand, the system has disadvantages in that chromatic colors are converted into achromatic colors in areas high and low in lightness. It also has disadvantages in that gradation is lost and that colors are crushed because all colors outside the gamut are converted into boundary colors.

(b) Saturation storage type (saturation match)

In the system shown in FIG. 10B, colors in the common area to input and output gamuts GIN and GOUT are stored as they are, as in FIG. 10A. On the other hand, if colors in input image data are outside the range of the output gamut GOUT, they are moved as indicated by arrows in FIG. 10B. That is, the colors are moved toward the origin of the L*a*b* space and are replaced with outermost colors in the output gamut GOUT (boundary colors).

This system can store saturation as much as possible without changing any hue. Therefore, it is appropriate for enhancing color differences and easily distinguishing colors in business graphs, computer graphics, etc. However, the system has disadvantages in that gradation characteristics become incorrect because lightness is changed. Like the system in FIG. 10A, the system in FIG. 10B also has disadvantages in that colors are crushed.

(c) Relative lightness storage type (perceptual match)

In the system shown in FIG. 10C, colors are moved toward origin O, as in the system in FIG. 10B. However, all colors in color space are moved. Here, imagining a straight line toward the color to be converted from the origin O and assuming that the length from the origin O to the boundary color of output gamut GOUT along the straight line is x1 and that the distance to the boundary color of input gamut GIN is x2, each color is adjusted so that the distance to the origin O becomes x1/x2 times.

The system, which can hold gradation characteristics over the whole of image data after gamut adjustment, can prevent color crushing, etc., and is appropriate for reproduction of natural images. However, since colors in the output gamut GOUT are also moved toward the origin O, the system has disadvantages in that it is poor in saturation of reproduction colors and cannot make the effective use of the output gamut GOUT.

As we have discussed, each of the gamut compression systems has its merits and demerits, and it is difficult to general users to decide which system is suitable for specific original images. All the systems discussed above may also be improper. In such a case, a more appropriate image may be able to be provided by mixing the results of the color adjustments.

SUMMARY OF THE INVENTION

It is therefore an object of the invention to provide an image processing system which enables the user to easily specify an appropriate gamut compression system and a gamut adjustment method.

To the end, according to a first aspect of the invention, there is provided an image processing system comprising means for inputting image data formed by a device, first recognition means for recognizing a gamut in a device-independent color space, related to the image data input through the image data input means, second recognition means for recognizing a gamut in a device-independent color space of an output device for outputting the image data, a plurality of means for applying gamut adjustments to the image data based on the gamuts recognized by the first and second recognition means, means for displaying a plurality of conversion image data pieces to which the gamut adjustments are applied by the gamut adjustment means, and means for selecting specific gamut adjustment means from among the gamut adjustment means based on the conversion image data pieces displayed by the display means.

In a second aspect of the invention, in the image processing system as recited in the first aspect of the invention, the gamut in a device-independent color space, related to the image data recognized by the first recognition means is a gamut in the device-independent color space that the device has.

In a third aspect of the invention, in the image processing system as recited in the first aspect of the invention, the gamut in a device-independent color space, related to the image data recognized by the first recognition means is a gamut in the device-independent color space that the image data itself has.

In a fourth aspect of the invention, in the image processing system as recited in the first aspect of the invention, the display means displays the conversion image data pieces and image data to which no gamut adjustments are applied at the same time.

In a fifth aspect of the invention, the image processing system as recited in the fourth aspect of the invention further includes means for displaying an out-gamut area distinguishably from other areas for the image data to which no gamut adjustments are applied, displayed on the display means.

In a sixth aspect of the invention, the image processing system as recited in the first aspect of the invention further includes means for storing the gamut adjustment means selected through the selection means and tag information addition means for adding contents of the gamut adjustment means stored in the storage means to the image data as tag information.

According to a seventh aspect of the invention, there is provided an image processing system comprising means for inputting image data formed by a device, first recognition means for recognizing a gamut in a device-independent color space, related to the image data input through the image data input means, second recognition means for recognizing a gamut in a device-independent color space of an output device for outputting the image data, means for applying gamut adjustments to the image data based on the gamuts recognized by the first and second recognition means, and display means for mixing color information contained in a plurality of conversion image data pieces to which the gamut adjustments are applied by the gamut adjustment means, and displaying the resultant data.

In an eighth aspect of the invention, in the image processing system as recited in the seventh aspect of the invention, the gamut in a device-independent color space, related to the image data recognized by the first recognition means is a gamut in the device-independent color space that the device has.

In a ninth aspect of the invention, in the image processing system as recited in the seventh aspect of the invention wherein the gamut in a device-independent color space, related to the image data recognized by the first recognition means is a gamut in the device-independent color space that the image data itself has.

In a tenth aspect of the invention, the image processing system as recited in the seventh aspect of the invention further includes means for specifying a mix level of the color information contained in the conversion image data pieces to which the gamut adjustments are applied by the gamut adjustment means and means for mixing the conversion image data pieces to which the gamut adjustments are applied, based on the mix specification made through the specification means, wherein the display means mixes the color information based on the mixing performed by the mixing means and displays the resultant data.

In an eleventh aspect of the invention, in the image processing system as recited in the tenth aspect of the invention, the display means geometrically places a mix of the color information contained in the conversion image data pieces to which the gamut adjustments are applied, and displays.

In a twelfth aspect of the invention, in the image processing system as recited in the eleventh aspect of the invention, the specification means is used to specify an arbitrary position on a display surface of the display means, further including means for determining the mix level based on coordinate positions of the conversion image data pieces geometrically placed and displayed by the display means and a position specified through the specification means.

In a thirteenth aspect of the invention, in the image processing system as recited in the tenth aspect of the invention, the specification means is used to specify a plurality of mix levels, the mixing means executes a plurality of mixing processes based on a plurality of mix levels specified through the specification means, and the display means gradually displays a plurality of image data pieces provided by the mixing means executing a plurality of mixing processes in response to the mix levels.

In a fourteenth aspect of the invention, the image processing system as recited in the seventh aspect of the invention further includes means for specifying a mix level of the color information contained in the conversion image data pieces to which the gamut adjustments are applied by the gamut adjustment means, means for storing information of the mix level specified through the specification means, and tag information addition means for adding the mix level specification information stored in the storage means to the image data as tag information.

According to a fifteenth aspect of the invention, there is provided a gamut adjustment method comprising the steps of recognizing an input gamut in a device-independent color space, related to input image data, recognizing an output gamut in a device-independent color space of an output device for outputting the image data, applying gamut adjustments to the image data based on the recognized input and output gamuts, displaying a plurality of conversion image data pieces to which the gamut adjustments are applied, and selecting specific gamut adjustment based on the conversion image data pieces displayed.

In a sixteenth aspect of the invention, in the gamut adjustment method as recited in the fifteenth aspect of the invention, the input gamut recognized is a gamut in the device-independent color space that an input device has.

In a seventeenth aspect of the invention, in the gamut adjustment method as recited in the fifteenth aspect of the invention, the input gamut recognized is a gamut in the device-independent color space that the image data itself has.

In an eighteenth aspect of the invention, in the gamut adjustment method as recited in the fifteenth aspect of the invention, the conversion image data pieces are displayed simultaneously with image data to which no gamut adjustments are applied.

In a ninteenth aspect of the invention, the gamut adjustment method as recited in the eighteenth aspect of the invention further comprises the step of displaying an out-gamut area distinguishably from other areas for displayed image data to which no gamut adjustments are applied.

In a twentieth aspect of the invention, the gamut adjustment method as recited in the fifteenth aspect of the invention further comprises the steps of storing the selected gamut adjustment and adding contents of the stored gamut adjustment to the image data as tag information.

According to a twenty-first aspect of the invention, there is provided a gamut adjustment method comprising the steps of recognizing an input gamut in a device-independent color space, related to input image data, recognizing an output gamut in a device-independent color space of an output device for outputting the image data, applying gamut adjustments to the image data based on the recognized input and output gamuts, specifying a mix level of the color information contained in the conversion image data pieces to which the gamut adjustments are applied, mixing the conversion image data pieces to which the gamut adjustments are applied, based on the mix level specification, and displaying the color information resulting from the mixing.

In a twenty-second aspect of the invention, in the gamut adjustment method as recited in the twenty-first aspect of the invention, the input gamut recognized is a gamut in the device-independent color space that an input device has.

In a twenty-third aspect of the invention, in the gamut adjustment method as recited in the twenty-first aspect of the invention, the input gamut recognized is a gamut in the device-independent color space that the image data itself has.

In a twenty-fourth aspect of the invention, in the gamut adjustment method as recited in the twenty-first aspect of the invention, the display is to geometrically place a mix of the color information contained in the conversion image data pieces to which the gamut adjustments are applied, and display.

In a twenty-fifth aspect of the invention, the gamut adjustment method as recited in the twenty-fourth aspect of the invention further comprises the steps of specifying an arbitrary position on a display surface of the color information resulting from the mixing and determining the mix level based on the specified position and coordinate positions of the conversion image data pieces geometrically placed and displayed.

In a twenty-sixth aspect of the invention, in the gamut adjustment method as recited in the twenty-first aspect of the invention, the mix level specification is made for a plurality of mix levels, the mixing is to execute a plurality of mixing processes based on the mix level specifications, and the color information display is to gradually display a plurality of image data pieces provided by executing the mixing processes in response to the mix levels.

In a twenty-seventh aspect of the invention, the gamut adjustment method as recited in the twenth-first aspect of the invention further comprises the steps of storing the specified color information mix level and adding the stored mix level specification information to the image data as tag information.

BRIEF DESCRIPTION OF THE DRAWINGS

The above and other objects and features of the present invention will be more apparent from the following description taken in conjunction with the accompanying drawings.

In the accompanying drawings.

DETAILED DESCRIPTION OF THE PREFERRED EMBODIMENTS

Now, a description will be given in more details of preferred embodiments of the present invention with reference to the accompanying drawings.

First embodiment
A. Outline of the embodiment
A-1. User interface of gamut

First, a gamut calculation method on a device-independent color space based on vision characteristics of human beings will be discussed. CIE 1976 L*a*b* equal color space according to CIE (Commission International de l'Eclairage) exists as a device-independent color space. The gamut on the color space can be provided if the most vibrant color in each lightness and each hue is found. Relative chromaticity of a CRT or a printer, namely, relative chromaticity based on the brightness of white and black points is found according to the following expressions (1):

$$L^* = 116(Y/Yn)^{1/3} - 16$$

$$a^* = 500\{(X/Xn)^{1/3} - (Y/Yn)^{1/3}\}$$

$$b^* = 200\{(Y/Yn)^{1/3} - (Z/Zn)^{1/3}\} \quad (1)$$

where X/Xn>0.008856, Y/Yn>0.008856, Z/Zn>0.008856, and Xn, Yn, and Zn are tristimulus values of a perfect diffuse surface.

Assuming that lightness is V, hue is h, and saturation is c* in L*a*b* color specification system, they are represented by the following expressions (2):

$$V = L^*$$

$$h = \tan^{-1}(b^*/a^*)$$

$$c^* = (a^{*2} + b^{*2})^{1/2} \quad (2)$$

A-2. Module configuration of embodiment

Figure 1:
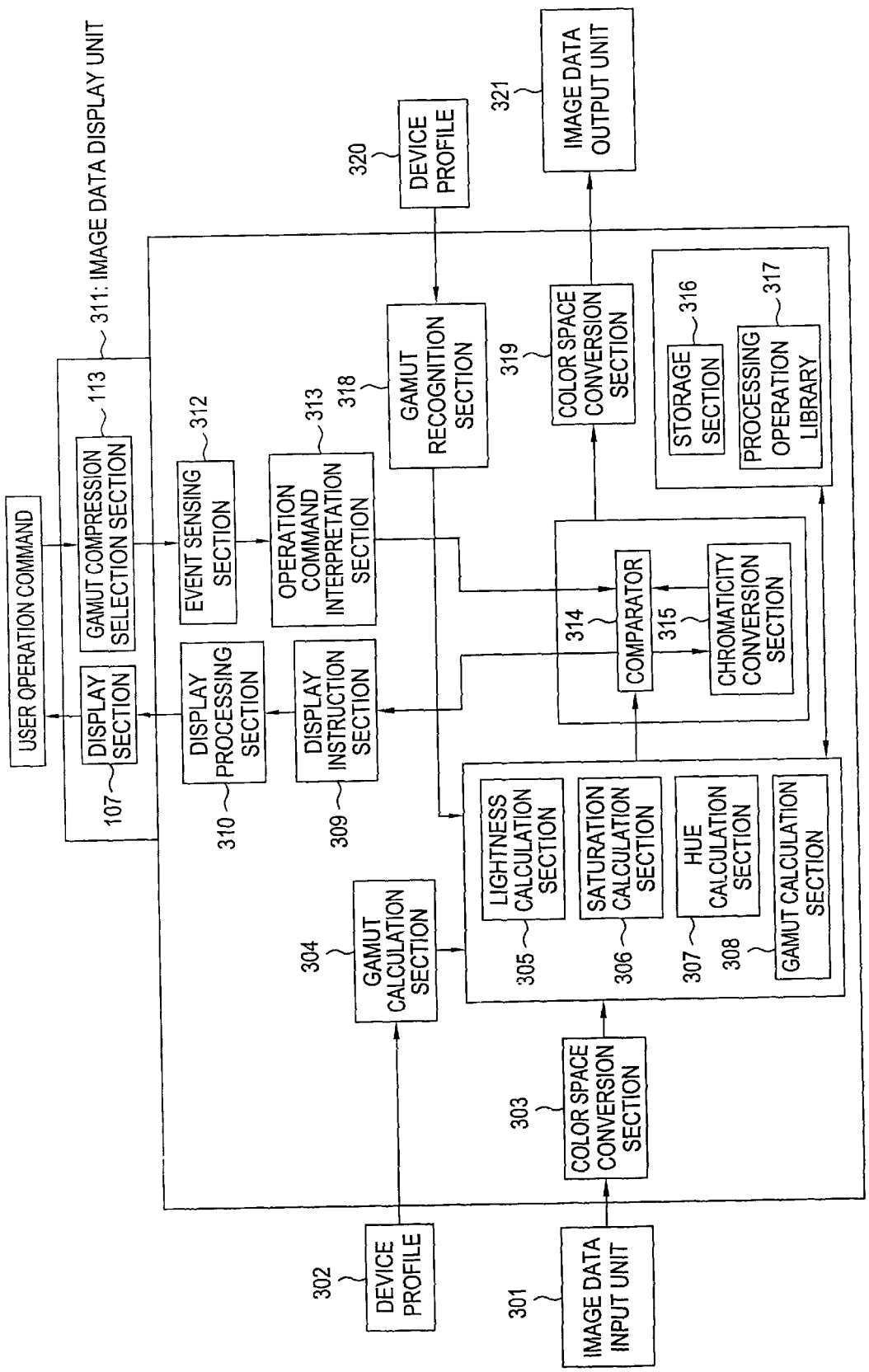
FIG. 1 is a block diagram showing the module configuration of a first embodiment of the invention.

FIG. 1 shows the module configuration of integrating hardware and software in the embodiment. In the figure, numeral 301 is an image data input unit and an input device profile 302 stores gamut information of the image data input unit 301. Numeral 303 is a color space conversion section for converting image data input from the image data input unit 301 into device-independent color space values.

Numeral 304 is a gamut recognition section for recognizing information concerning the gamut of the image data input unit 301 based on the input device profile 302. Numeral 321 is an image data output unit for outputting supplied image data. Numeral 320 is an output device profile for storing gamut information of the image data output unit 321. Numeral 318 is a gamut recognition section for recognizing the gamut of the image data output unit 321 based on the output device profile 320.

A lightness calculation section 305, a saturation calculation section 306, a hue calculation section 307, and a gamut calculation section 308 calculate various color parameters based on information obtained from the gamut recognition sections 304 and 318. Numeral 316 is a storage section for providing a storage area to execute necessary calculations in the calculation sections 305, 306, 307, and 308. Numeral 317 is a process operation library for storing a library required for calculations of the calculation sections 305 to 308.

Numeral 314 is a comparator for comparing the gamuts of the image data input unit 301 and the image data output unit 321. Numeral 315 is a chromaticity conversion section for executing gamut compression conversion by a default gamut compression method of the system specified by the user. Numeral 319 is a color space conversion section. When gamut compressed image data is output via the image data output unit 321 from the system, the color space conversion section 319 converts the image data into a color space corresponding to the image data output unit 321.

Numeral 311 is an image data display unit consisting of a display section 107 for displaying various data pieces and a gamut compression selection section 113 for selecting a gamut compression method, etc., based on user operation. The display section 107 displays image data input to the system and image data being processed by the system. Numeral 309 is a display instruction section for issuing instructions for properly displaying image data and a user interface on the image data display unit 311. Numeral 310 is a display processing section for performing processing for displaying proper contents based on instructions of the display instruction section 309. Numeral 312 is an event sensing section for sensing an event caused by the user based on information displayed on the image data display unit 311. Numeral 313 is an operation command interpretation section for sensing the contents of an event sensed in the event sensing section 312.

B. Hardware configuration of embodiment

Figure 2:
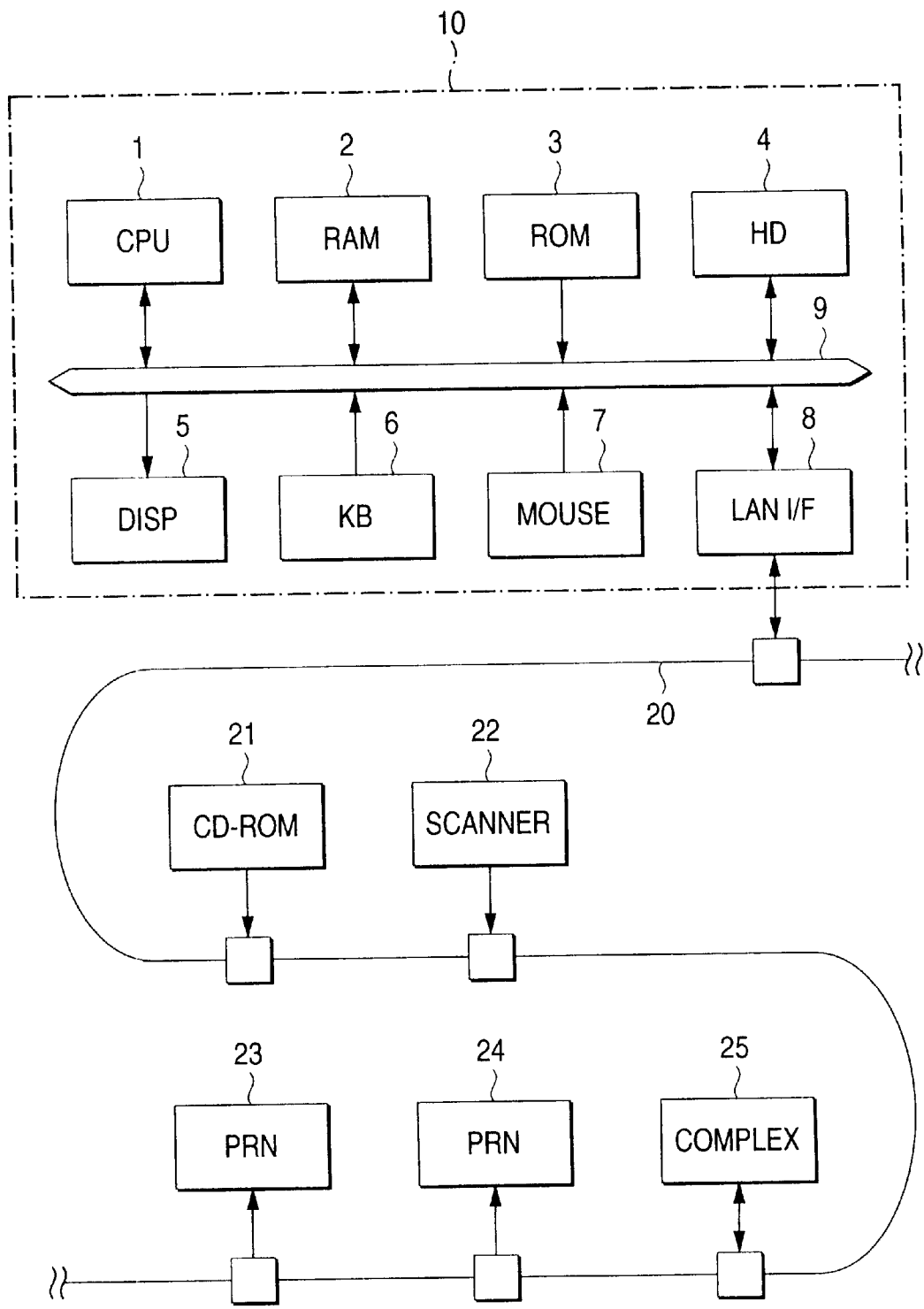
FIG. 2 is a block diagram showing the hardware configuration of the first embodiment of the invention.

Next, the hardware configuration of the embodiment will be discussed with reference to FIG. 2.

In the figure, numeral 10 is a workstation which comprises a CPU 1 for controlling the sections based on a program described later, a RAM 2 and a ROM 3 accessed by the CPU 1, and a hard disk 4 for storing various programs and data. Various pieces of information are displayed on a display 5 under the control of the CPU 1, enabling the user to enter various pieces of information through a keyboard 6 or with a mouse 7.

Numeral 20 is a local area network (LAN) to which a CD-ROM drive 21, a scanner 22, printers 23 and 24, and a complex 25. The workstation 10 is also connected to the LAN 20 via a LAN interface 8. The CD-ROM drive 21 and the scanner 22 can be the image data input unit 301 and the printers 23 and 24 can be the image data output unit 321. Also, the complex 25 can be both the image data input and output units.

C. Operation of embodiment

C-1. Initialization

Figure 3:
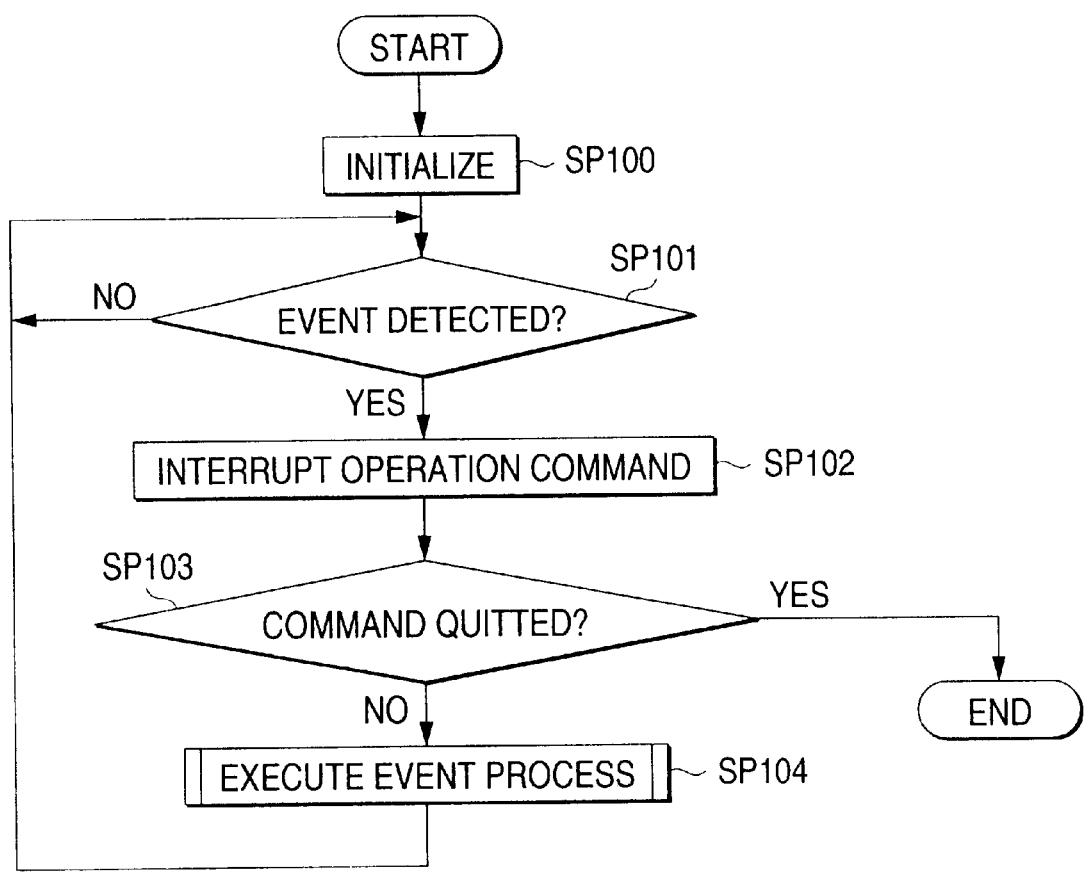
FIG. 3 is a flowchart of the main routine of the first embodiment of the invention.

Next, the operation of the embodiment will be discussed. First, the operating system of the workstation 10 starts an application via a window shell. Here, when the user gives a start command of an application named a "gamut compression system," a program shown in FIG. 3 is started.

In the figure, when control goes to step SP100, predetermined initialization is performed. First, default data is read from the hard disk 4. Display mode, original image, image data input unit 301, image data output unit 321, gamut compression system, and the like are specified as the default data. These will be simply discussed below:

<Display mode>

Figure 4:
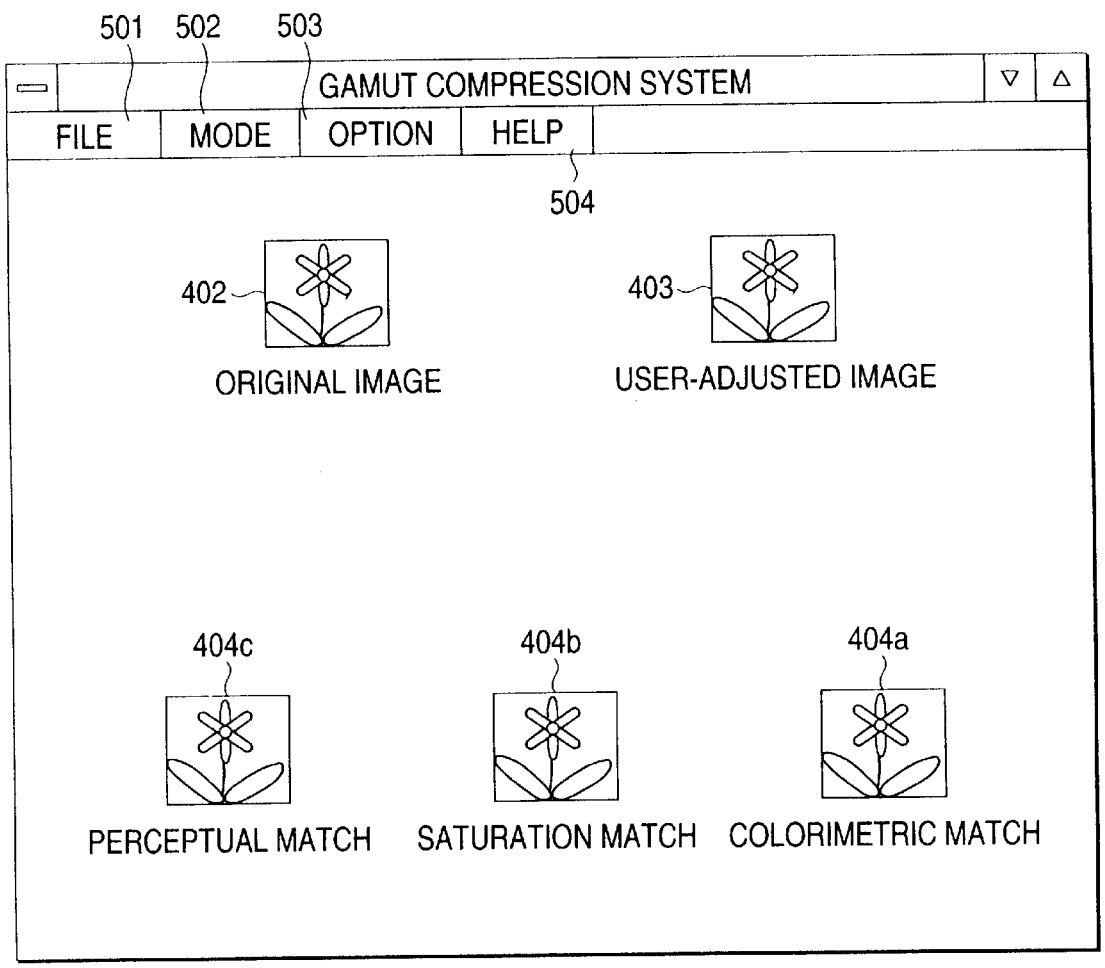
FIG. 4 is an illustration showing a display example of a display.

The embodiment enables the user to select one of various display modes from simple to complicated ones to determine the gamut compression system (this topic will be discussed in detail later). When a default display mode is read, a window based on the display mode is displayed on the display 5. FIG. 4 shows an example of the displayed window. It provides a window when the simplest display mode is selected as the default display mode, which will be hereinafter called "simple selection window 401."

<Original image>

The original image refers to image data before gamut compression is executed. It is displayed in the upper-left corner of the simple selection window 401. If the original image has a large size, pixels are thinned out appropriately, whereby the original image enters a predetermined display space in the simple selection window 401.

<Image data input unit>

Any one of the CD-ROM drive 21 (more strictly speaking, the format of image data handled in CD-ROM inserted into the CD-ROM drive), the scanner 22, the complex 25, etc., is specified as a default image data input unit 301. The image data input unit is thus specified, whereby its corresponding input device profile 302 is also specified. Input device profiles corresponding to the image data input units are previously stored on the hard disk 4, and the specified one of them is read from the hard disk 4.

<Image data output unit>

Any one of the printers 23 and 24, the complex 25, etc., is specified as a default image data output unit 321. As with the image data input unit 301, the output device profile 320 corresponding to the default image data output unit 321 is read from the hard disk 4.

Figure 10A:
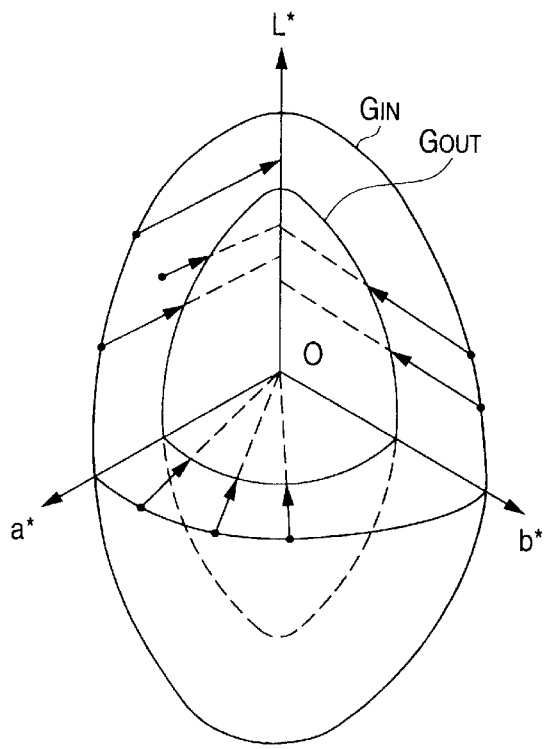
FIGS. 10A to 10C illustrations of gamut compression systems.
Figure 10B:
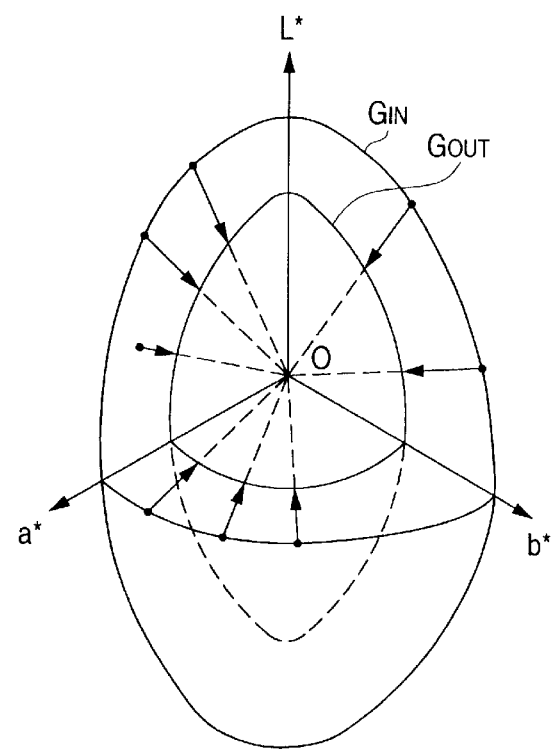
Figure 10C:
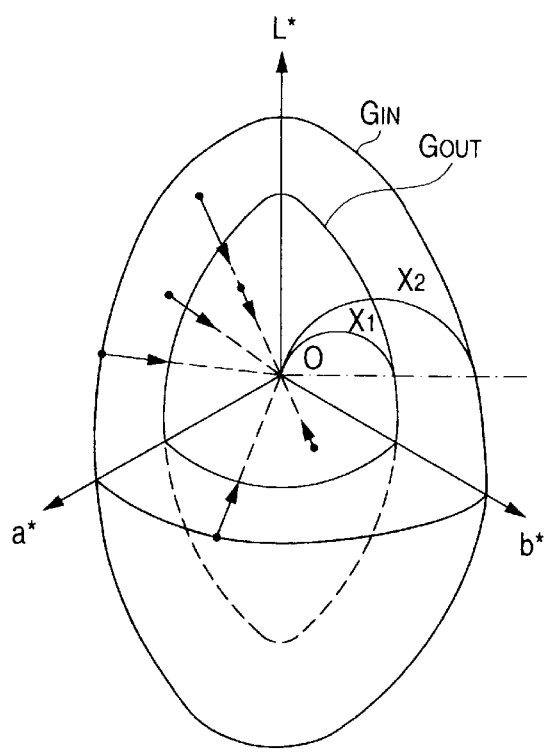

The input and output device profiles 302 and 320 are synonymous with the input gamut GIN and the output gamut GOUT shown in FIGS. 10A to 10C. When they are specified, the results of applying the gamut compression systems (common area storage type, saturation storage type, and relative lightness storage type) for compressing the original image 402 (conversion images 404a–404c) are calculated and arranged at the bottom of the simple selection window 401.

Figure 14:
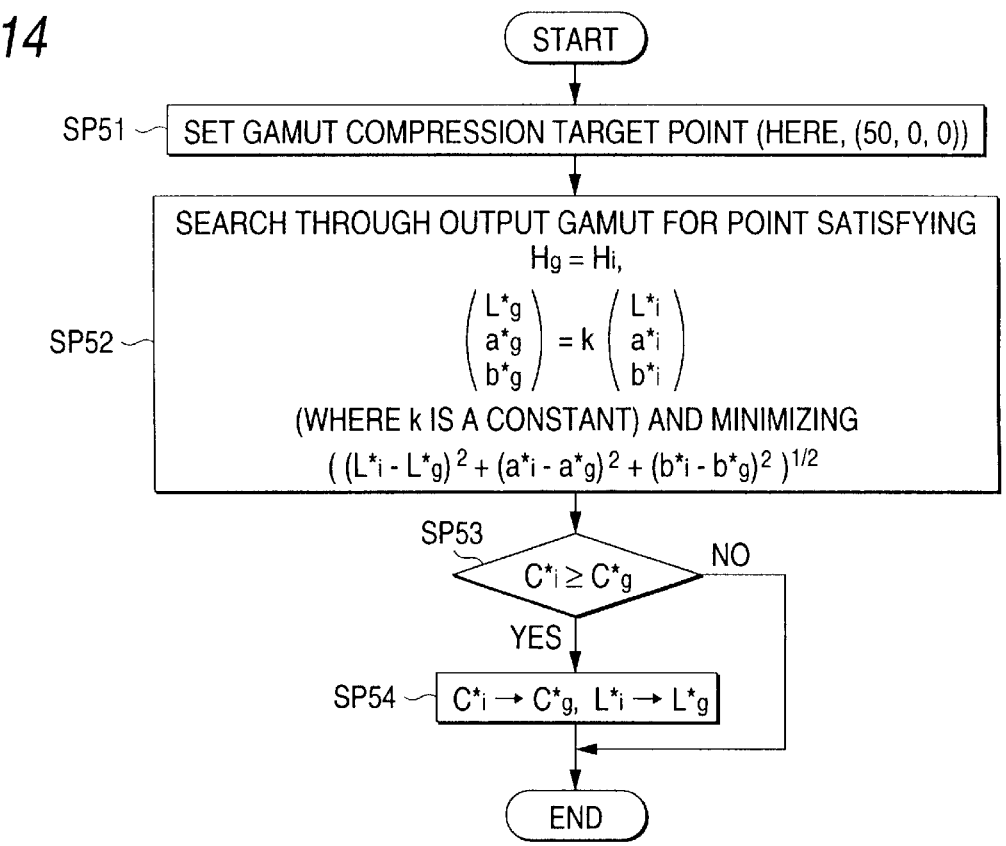
FIG. 14 is a flowchart of gamut compression processing of saturation storage type.
Figure 15:
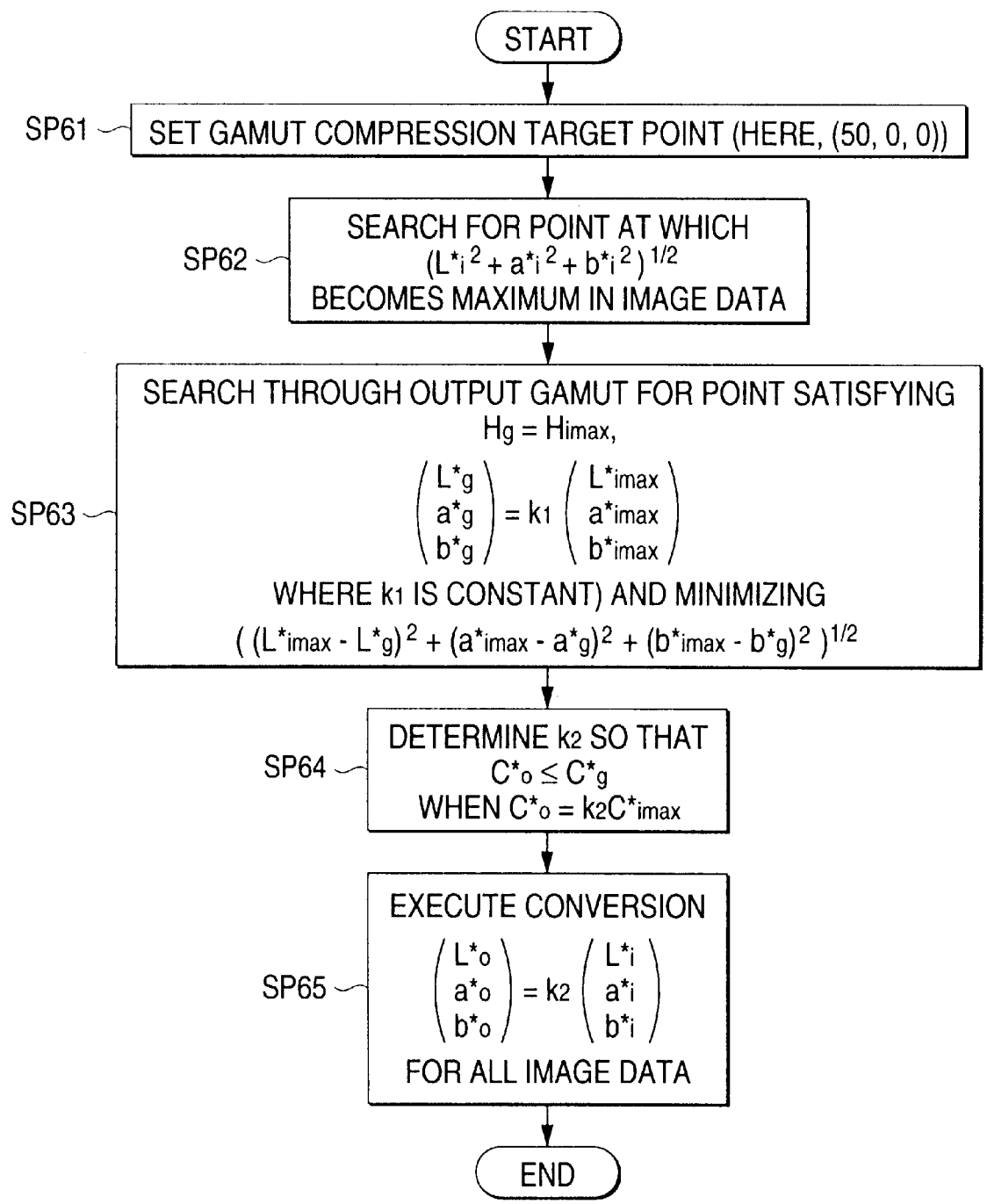
FIG. 15 is a flowchart of gamut compression processing of relative lightness storage type.

Gamut compression processing will be discussed in detail with reference to FIGS. 13–15.

Figure 13:
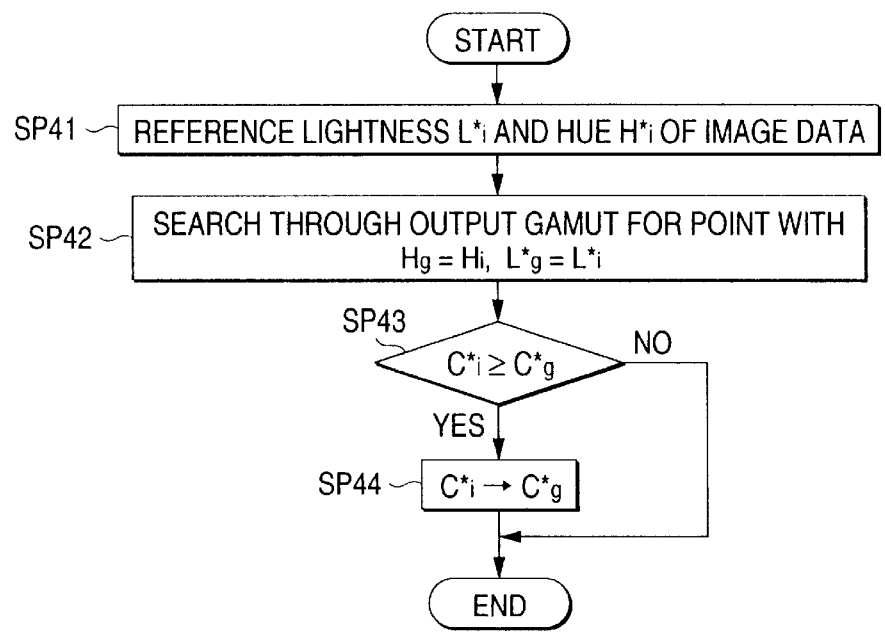
FIG. 13 is a flowchart of gamut compression processing of common area storage type.

FIG. 13 shows the contents of gamut compression processing of the common area storage type. In the figure, when control goes to step SP41, lightness $L^*i$ and hue Hi of input image data are referenced. Next, when control goes to step SP42, the output gamut GOUT is searched through for pixel value ($L^*g$, $a^*g$, $b^*g$) with hue Hg=Hi and lightness $L^*g=L^*i$.

Next, when control goes to step SP43, whether or not the relation of saturation $C^*i \geq C^*g$ holds for the found pixel value ($L^*g$, $a^*g$, $b^*g$) is determined. If the relation does not hold, the pixel value ($L^*i$, $a^*i$, $b^*i$) lies in the output gamut GOUT, thus is not changed.

On the other hand, if the determination at step SP43 is YES, control goes to step SP44 at which the pixel value ($L^*i$, $a^*i$, $b^*i$) is changed (compressed) so that saturation $C^*i=C^*g$.

Next, the contents of gamut compression processing of the saturation storage type will be discussed with reference to FIG. 14. In the figure, when control goes to step SP51, a gamut compression target point is set. Here, the point (L*, a*, b*)=(50, 0, 0) is set as the target point.

When control goes to step SP52, the output gamut GOUT is searched through for a point satisfying hue Hg=Hi and pixel value (L*g, a*g, b*g)=k (L*i, a*i, b*i) (where k is a constant) and minimizing $\{(L^*i-L^*g)^2+(a^*i-a^*g)^2+(b^*i-b^*g)^2\}^{1/2}$.

Next, when control goes to step SP53, whether or not the relation of saturation C*i≧C*g holds for the found pixel value (L*g, a*g, b*g) is determined. If the relation does not hold, the pixel value (L*i, a*i, b*i) lies in the output gamut GOUT, thus is not changed.

On the other hand, if the determination at step SP53 is YES, control goes to step SP54 at which the pixel value (L*i, a*i, b*i) is changed so that saturation C*i=C*g and that lightness L*i=L*g.

Next, the contents of gamut compression processing of the relative lightness storage type will be discussed with reference to FIG. 15. In the figure, when control goes to step SP61, a gamut compression target point is set. Here, the point (L*, a*, b*)=(50, 0, 0) is set as the target point.

When control goes to step SP62, a search is made for a point at which $(L^*i^2, a^*i^2, b^*i^2)^{1/2}$ becomes the maximum for pixel value (L*i, a*i, b*i) of input image data. That is, a search is made for the pixel value of the outermost contour most distant from the target point. Here, assume that the found pixel value is L*imax, a*imax, b*imax and that its hue is Himax.

Next, when control goes to step SP63, the output gamut GOUT is searched through for a point satisfying hue Hg=Himax and pixel value (L*g, a*g, b*g)=k1 (L*imax, a*imax, b*imax) (where k1 is a constant) and minimizing $\{(L^*imax-L^*g)^2+(a^*imax-a^*g)^2+(b^*imax-b^*g)^2\}^{1/2}$.

In other words, a search is made for a pixel value on the line connecting the target point and the outermost contour pixel value in the L*a*b* space and nearest to the outermost contour pixel value in the range of the output gamut GOUT. Next, when control goes to step SP64, constant k2 is determined so that C*o≦C*g always holds when saturation after compression processing, C*o=k2C*imax.

When control goes to step SP65, conversion according to (L*o, a*o, b*o)=k2 (L*i, a*i, b*i) is executed for all pixel values of input image data, whereby gamut compression is executed over the entire input pixel values.

<Gamut compression system>

Any of the three systems described above is specified as the default gamut compression system. The conversion image data corresponding to the specified system is copied into the upper-right corner of the simple selection window 401 as a use-adjusted image 403. The contents of the simple selection window 401 shown in FIG. 4 are now complete.

Conversion images 404a to 404c provided by the processing described above are stored on the hard disk 4 in correspondence with the original image 402. Therefore, when the program is again started later, images read from the hard disk 4 are used as the conversion images 404a to 404c, whereby the program is started up fast.

C-2. Process for FILE→OPEN event

Referring again to FIG. 3, when control goes to step SP101 the system waits for the user to cause an event through the keyboard 6 or with the mouse 7. When an event occurs, control goes to step SP102 at which the contents of the event are interpreted in response to the displayed window contents and the position of the mouse cursor or keyboard cursor at the occurrence time of the event.

Next, when control goes to step SP103, whether or not the interpreted event contents are a command for quitting the program is determined. If the determination at step SP103 is NO, control goes to step SP104 and the process corresponding to the interpreted event contents is executed. Then, control returns to step SP101 and the steps are repeated for the next occurring event.

Figure 5:
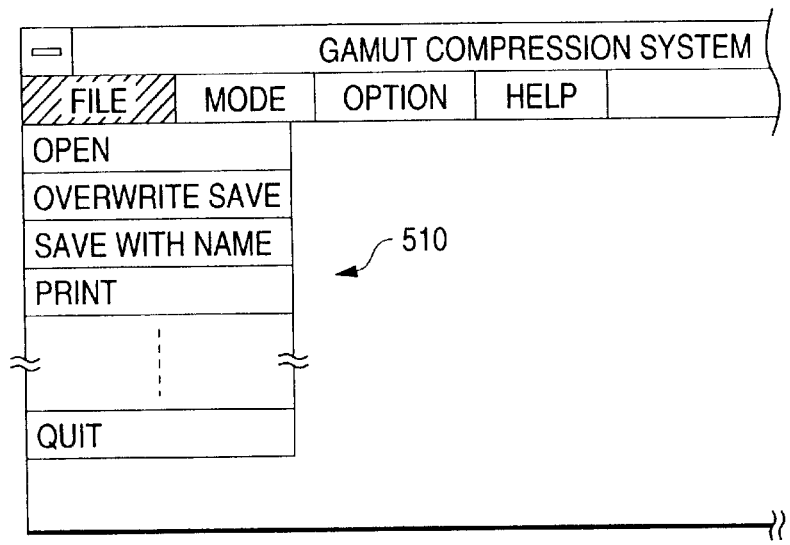
FIG. 5 is an illustration showing a display example of the display.

When the user clicks on a FILE button 501, the FILE button 501 is reverse-displayed and a list box as shown in FIG. 5 is displayed below the FILE button 501. Here, when the user clicks on the OPEN item, image data files in the hard disk 4 (files with a predetermined extension) are listed.

If the user double clicks on a desired file, the image data in the file is specified as a new original image 402. That is, the new image data is compressed by the gamut compression systems and resultantly, the conversion images 404a–404c and user-adjusted image 403 are also changed to those corresponding to the new original image 402.

C-3. Double click on images

To display the original image 402, user-adjusted image 403, or conversion images 404a–404c in the simple selection window 401, pixels may be thinned out for reduction from the original dimensions, as described above. In such a case, when the user double clicks on any of the images, the corresponding image is restored to the actual size. If the user double clicks on the image restored to the actual size, the image is returned to the display size in the simple selection window 401.

C-4. Dragging and dropping conversion images 404a–404c

Basically, the user clicks on a desired one of the conversion images 404a–404c, thereby specifying the gamut compression system, and the specified image is displayed as the user-adjusted image. However, the user can also drag and drop a desired one of the conversion images 404a–404c into the user-adjusted image 403, thereby changing the user-adjusted image 403. For example, if the user sets the mouse cursor to the conversion image 404a, presses the mouse button, moves the mouse cursor to the position of the user-adjusted image 403 without releasing the mouse button, and then releases the mouse button, the conversion image 404a is selected as a new user-adjusted image 403.

C-5. FILE→OVERWRITE SAVE event

When the user clicks on the FILE button 501 and then double clicks on an OVERWRITE SAVE button, the user-adjusted image 403 is stored on the hard disk 4 in place of the original image 402. When the user double clicks on a SAVE WITH NAME button rather than the OVERWRITE SAVE button, a text input box is displayed together with a message of "Specify file name." Here, if the user enters a desired file name through the keyboard 6, the contents of the user-adjusted image 403 are saved in a new file having the entered file name.

C-6. Process for MODE→MIX MODE event

When the user clicks on a MODE button 502, a list box consisting of character strings of ❶SIMPLE MODE, ⓪ MIX MODE, and ⓪ MIX+INTERMEDIATE MODE is displayed below the MODE button 502 for listing selectable display modes and distinguishing the currently selected display mode marked ❶ (in the example, SIMPLE MODE) from other modes.

Figure 6:
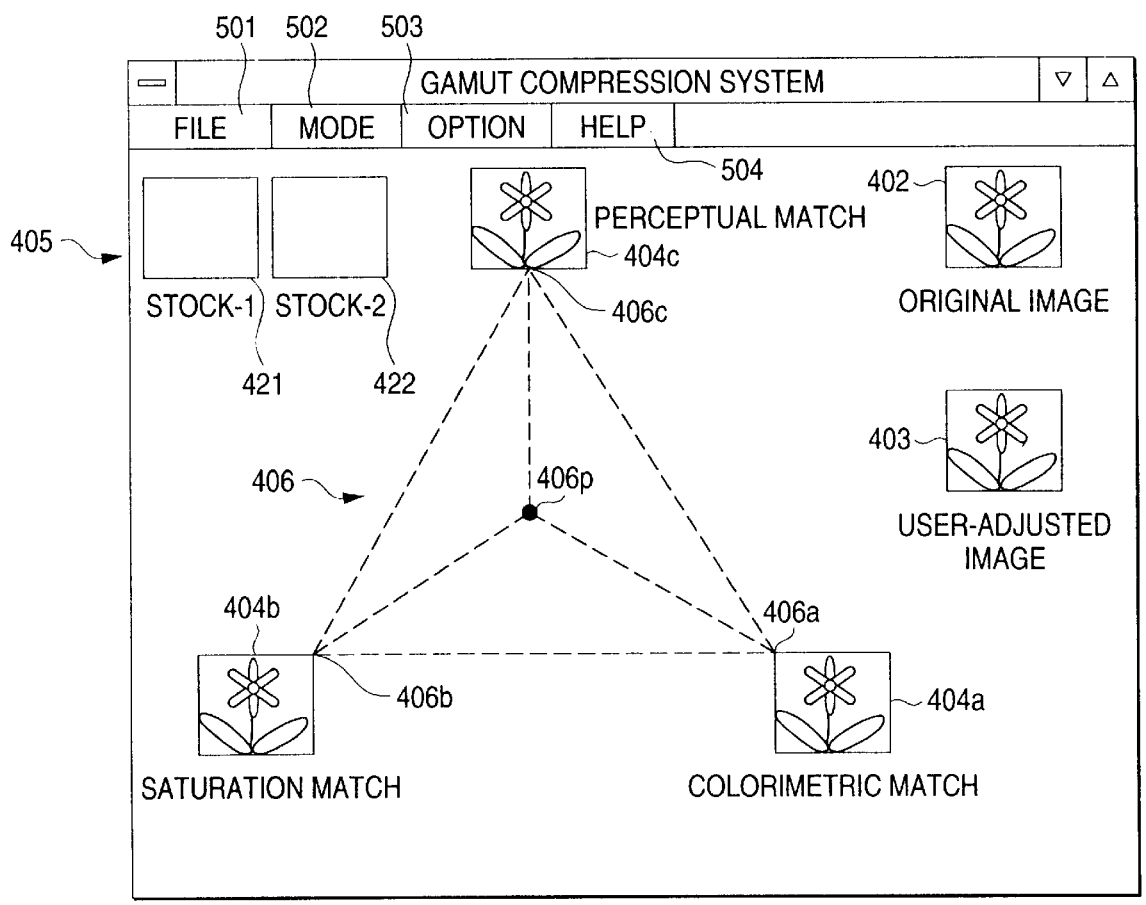
FIG. 6 is an illustration showing a display example of the display.

The user can select any display mode disjunctively in the list box. For example, if the user clicks on the prefix ⓪ to the character string of ⓪ MIX MODE, the display mode is changed to the MIX MODE. That is, a mix selection window 405 shown in FIG. 6 is displayed on the display 5 in place of the simple selection window 401. In FIG. 6, a mix percentage scale 406 is displayed by a triangle drawn by broken lines connecting vertexes 406a–406c almost at the center of the window. Broken lines connecting an arbitrary point 406*p* in the triangle and the vertexes 406*a*–406*c* of the triangle are also drawn.

C-7. Process for event on mix percentage scale 406

Figure 7:
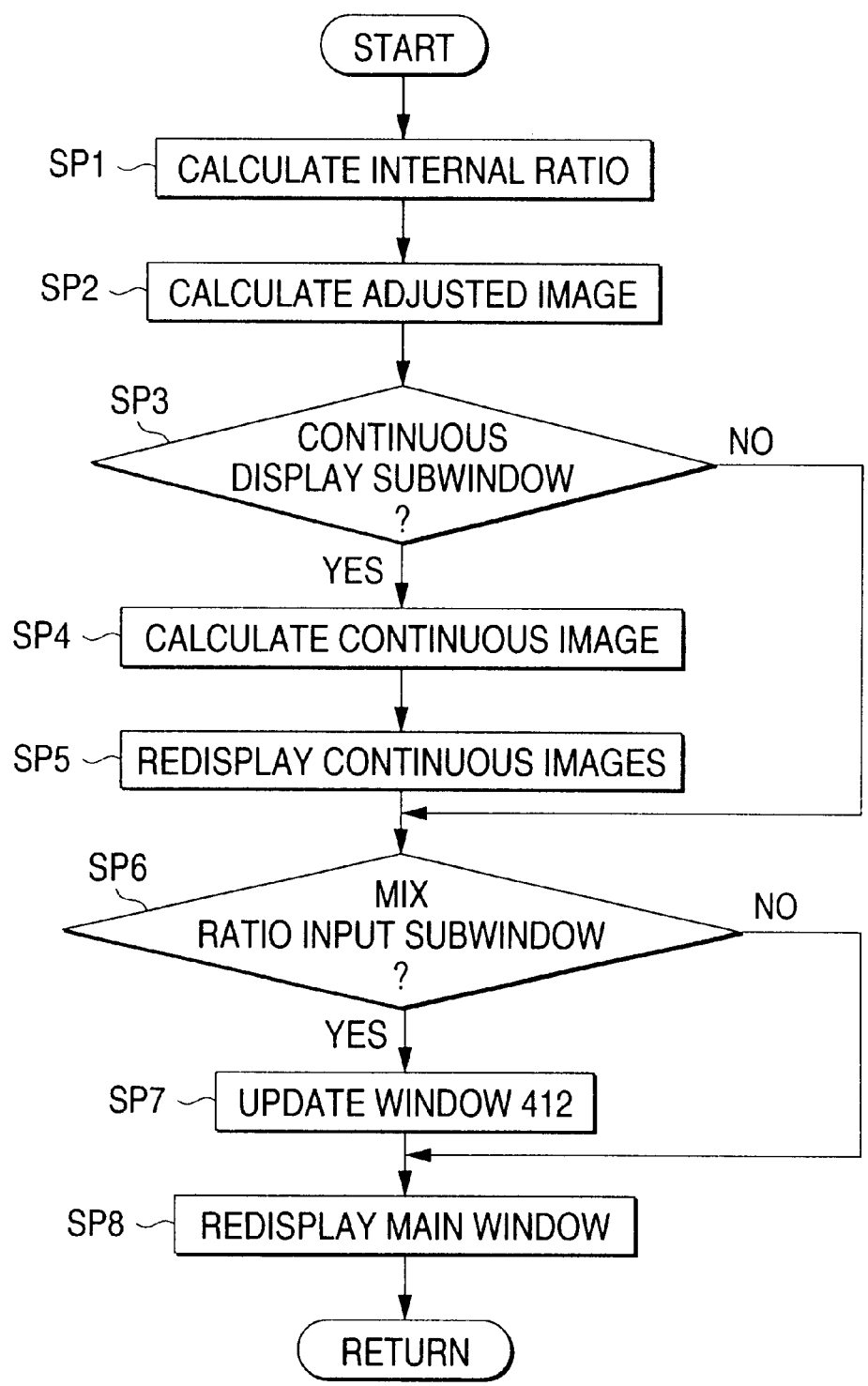
FIG. 7 is a flowchart of a subroutine of the first embodiment of the invention.

The mix mode enables the user not only to perform every operation described for the simple mode, but also to specify the position of the point 406*p* by clicking on any point on the mix percentage scale 406. When the user clicks on any point, a subroutine shown in FIG. 7 is called. In the figure, when control goes to step SPI, first the distances between the current mouse cursor position (new specified point 406*p*) and the vertexes 406*a*–406*c*, ra, rb, and rc, are found. Next, internal ratio na, nb, nc is found based on the following expressions (3):

$$na=ra/(ra+rb+rc)$$

$$nb=rb/(ra+rb+rc)$$

$$na=rc/(ra+rb+rc) \quad (3)$$

Next, when control goes to step SP2, pixel values rp, gp, and bp of user-adjusted image 403 are calculated based on the following expression (4):

$$rp=nar1+nbr2+ncr3$$

$$gp=nag1+nbg2+ncg3$$

$$bp=nab1+nbb2+ncb3 \quad (4)$$

where r1, g1, and b1 are pixel values of conversion image 404*a*, r2, g2, and b2 are pixel values of conversion image 404*b*, and r3, g3, and b3 are pixel values of conversion image 404*c*. As seen from expression (4), the user-adjusted image 403 is generated by mixing the conversion images 404*a*–404*c* in response to the internal ratio na, nb, nc.

Next, when control goes to step SP3, whether or not a continuous image display subwindow 411, which will be described later in detail, is displayed on the display 5 is determined. Since the subwindow is not displayed at present, the determination at step SP3 becomes NO and control goes to step SP6 at which whether or not a mix ratio input subwindow 412, which will be described later in detail, is displayed on the display 5 is determined. Since the subwindow is not displayed at present, the determination at step SP6 becomes NO and control goes to step SP8.

At step SP8, the main window (in the example, the mix selection window 405) is again displayed in response to the process results of steps SPI and SP2. That is, the display contents of the mix percentage scale 406 are updated in response to the new setup point 406*p* and the new user-adjusted image 403 provided according to Expression (4) is displayed replacing the former user-adjusted image 403. Then, control returns to the main routine (FIG. 3).

C-8. Dragging and dropping user-adjusted image 403

As described above, the user can specify the position of the point 406*p* appropriately, thereby displaying the user-adjusted image 403 corresponding thereto. However, if the point 406*p* is moved carelessly, there is also the possibility that the user-adjusted image 403 may become inferior to the former one in quality. Thus, in the embodiment, user-adjusted images 403 can be stocked appropriately.

That is, if the user drops and drags the user-adjusted image 403 into a stock image 421 or 422, the user-adjusted image 403 is copied into the stock image 421 or 422, and the coordinates of the point 406*p* corresponding to the copied image are stored in the RAM 2. To restore the stock image 421 or 422 to the user-adjusted image 403, the user may drag and drop a desired stock image into the user-adjusted image 403. At the time, the point 406*p* is moved to the position stored corresponding to the stock image and the stock image is set to a new user-adjusted image 403.

C-9. Process for MODE→MIX+INTERMEDIATE MODE event

Figure 8:
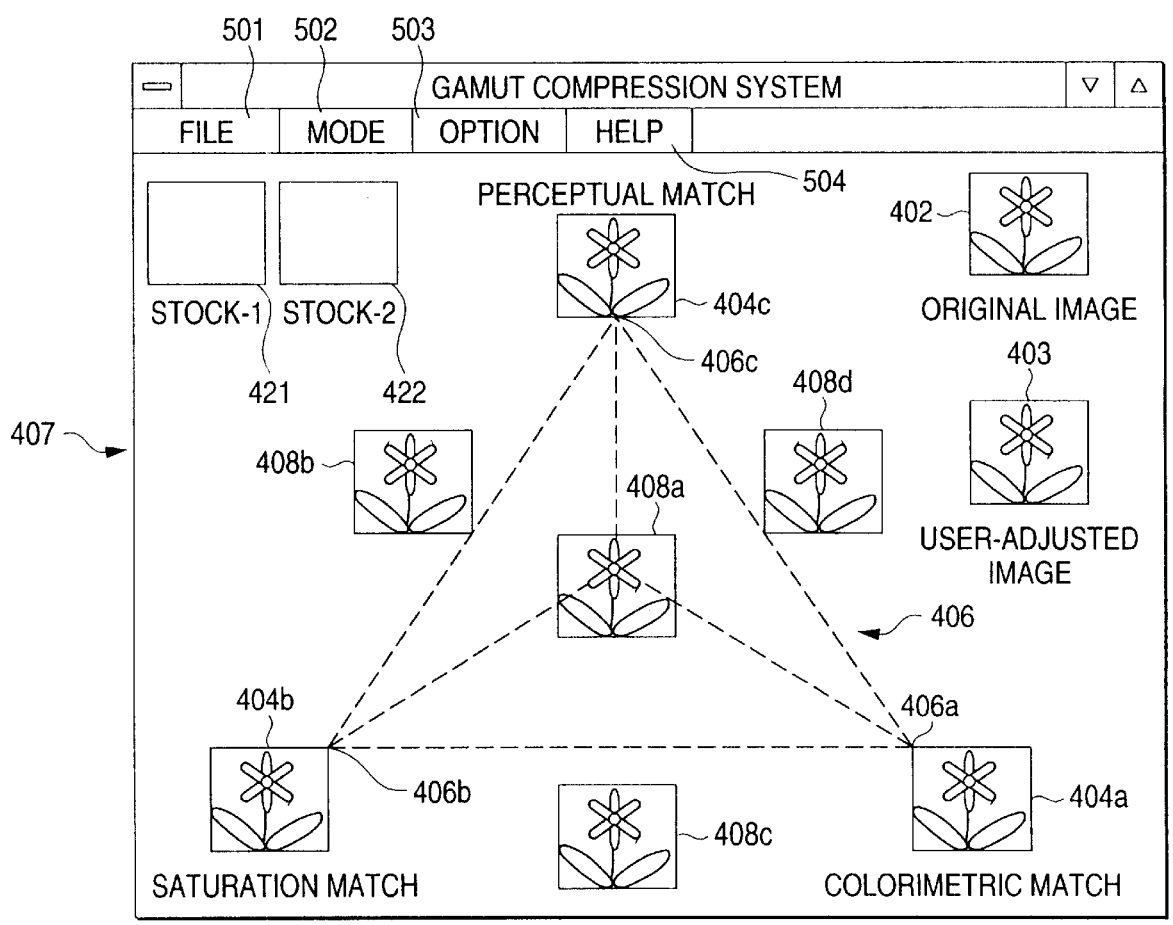
FIG. 8 is an illustration showing a display example of the display.

As described above, the user can click on the MODE button 502, thereby selecting a desired display mode. When the 0 MIX+INTERMEDIATE MODE is selected, a mix selection window with intermediate images 407 shown in FIG. 8 is displayed in place of the mix selection window 405.

The mix selection window with intermediate images 407 displays intermediate images 408*a*–408*d* corresponding to the center point of the triangle of the mix percentage scale 406 and the center points of the sides of the triangle. That is, if the center points are selected as the point 406*p*, the user-adjusted image 403 becomes equal to the intermediate images 408*a*–408*d*. The operation method in the MIX+INTERMEDIATE MODE is the same as that in the MIX MODE. However, the MIX+INTERMEDIATE MODE has advantages in that the displayed intermediate images 408*a*–408*d* serve as an easy guide for the user to specify the point 406*p*.

C-10. Process for OPTIONS event

When the user clicks on an OPTIONS button 503, a list box consisting of character strings of 0 MIX RATIO INPUT SUBWINDOW and 0 CONTINUOUS IMAGE DISPLAY SUBWINDOW is displayed below the OPTIONS button 503 for listing option windows that can be specified. The user can set on/off of a desired option window in the list box.

Figure 9:
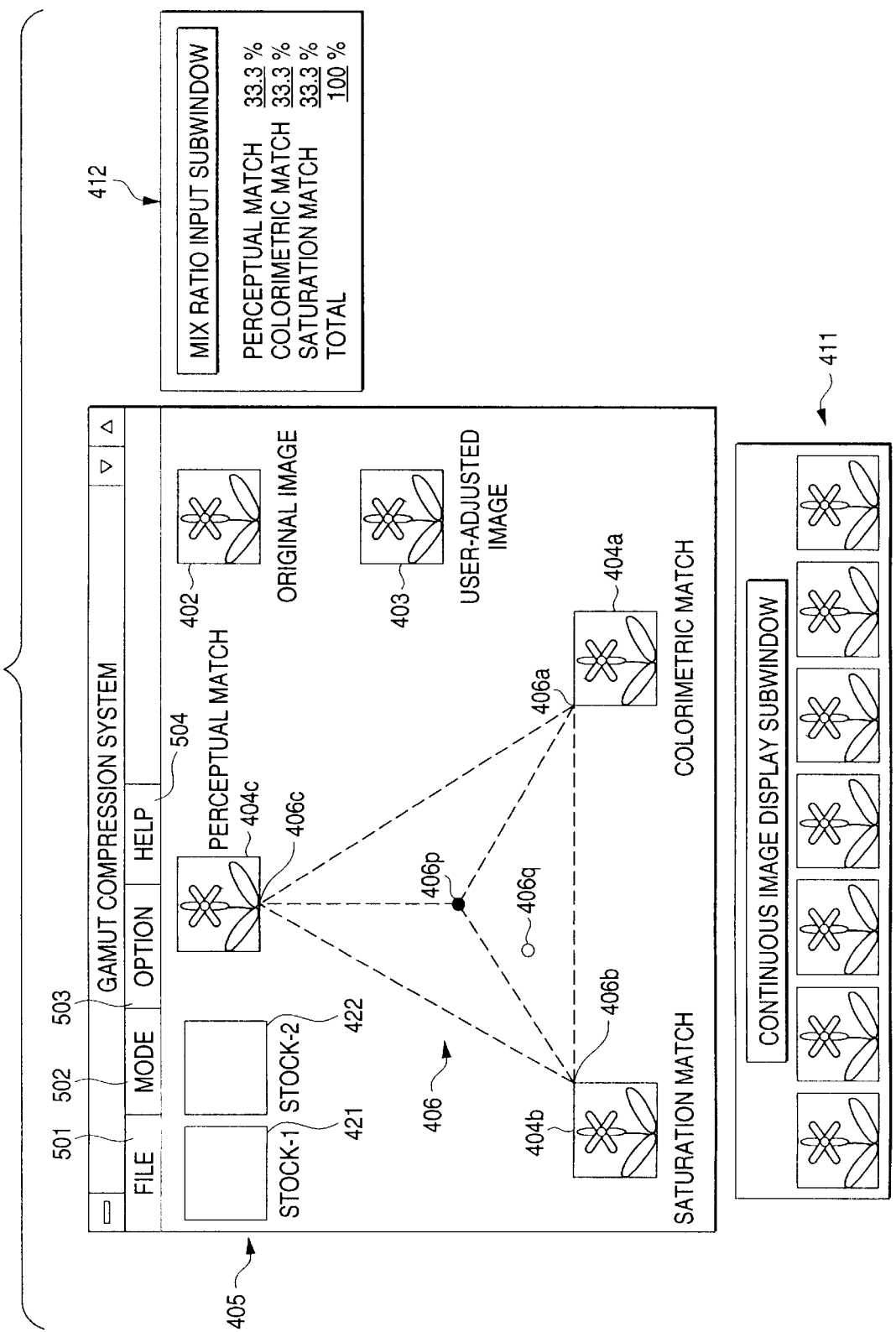
FIG. 9 is an illustration showing a display example of the display.

That is, if the user clicks on the 0 mark in the character string related to a desired option window, the option window is set to the on state and the 0 mark is changed to a ●mark. If the user clicks on the ●mark in the character string related to the option window already in the on state, the option window is set to the off state and the ●mark is changed to a 0 mark. FIG. 9 shows a display example of the display 5 when both option windows are set to the on state in the mix mode. In the figure, numeral 411 is a continuous image display subwindow and a numeral 412 is a mix ratio input subwindow.

C-11. Process for event on mix percentage scale 406 when continuous image display subwindow 411 is displayed As described above, when the user clicks on the mix percentage scale 406, the subroutine shown in FIG. 7 is called. At the time, if the continuous image display subwindow 411 is displayed on the display 5, the determination at step SP3 becomes YES and steps SP4 and SP5 are executed.

At step SP4, first a line connecting a new specified point 406*p* and the position of point 406*p* before the user clicks on, which will be hereinafter called point 406*q*, is assumed, and is divided into n equal parts (in the example shown in FIG. 9, n=6) to find division points. The division points contain points 406*p* and 406*q*. That is, the number of division points becomes "n+1."

Next, internal ratio na, nb, nc (see Expression (3)) is found for each of the division points and n+1 images, which will be hereinafter called continuous images, are found based on n+1 sets of internal ratios na, nb, nc and Expression (4). Next, when control goes to SP5, the continuous images are redisplayed in the continuous image display subwindow 411. As described above, when step SP8 is executed, the main window (mix selection window 405) is redisplayed; if the continuous image display subwindow 411 is displayed, the point 406*q* is also displayed in the mix percentage scale 406 (see FIG. 9).

C-12. Process for event on mix percentage scale 406 when mix ratio input subwindow 412 is displayed When the mix ratio input subwindow 412 is displayed, if the subroutine in FIG. 7 is called, the determination at step SP6 becomes YES and step SP7 is executed. Here, the internal ratio na, nb, nc previously found at step SP1 is displayed in percentage in the mix ratio input subwindow 412.

C-13. Process for event on mix ratio input subwindow 412

When the user clicks on the mix ratio input subwindow 412, a keyboard cursor appears in mix ratio input subwindow 412, enabling the user to specify the internal ratio na, nb, nc in percentage through the keyboard.

If the user presses a predetermined key after setting a desired internal ratio, a predetermined subroutine is called. The subroutine has the same contents as that shown in FIG. 7 except that it calculates the coordinates of the point 406p corresponding to the entered internal ratio instead of executing step SP1 shown in FIG. 7.

C-14. Process for event on continuous image display subwindow 411

The user can perform operation on continuous images displayed in the continuous image display subwindow 411 as images displayed in the mix selection window 405. That is, when the user double clicks on a desired one of the continuous images, the continuous image is displayed on an enlarged scale.

The user can also drag and drop a desired continuous image, thereby setting the image as a user-adjusted image 403 or a stock image 421 or 422, whereby the user can specify the optimum one as the user-adjusted image 403, etc., while comparing the continuous images different from each other gradually; he or she can set the gamut extremely efficiently.

C-15. FILE→QUIT event

When the user clicks on the FILE button 501 and then double clicks on a QUIT button, the CPU 1 recognizes the command. This corresponds to step SP102 in the main routine (FIG. 3). Next, when control goes to step SP103, the determination at step SP103 becomes YES and the program is terminated. After this, control is passed to the window shell of the operating system and the windows described above are closed.

Second embodiment

A. Outline of the embodiment

Next, a second embodiment of the invention will be discussed. In the first embodiment we have discussed, the result of applying gamut compression to input image data is supplied to the image data output unit 321. However, if the image data output unit 321 itself has a gamut compression function, the load of the CPU 1 can be distributed by causing the image data output unit 321 to perform gamut compression.

In contrast, if the image data output unit 321 is put under heavy load, the CPU 1 may perform gamut compression as in the first embodiment. To cause the image data output unit 321 to perform gamut compression, it is necessary to supply image data to which gamut compression is not yet applied to the image data output unit 321 and specify a gamut compression method for the image data output unit 321. Such specification is made according to data stored in a "tag" attached to the image data.

Figure 19:
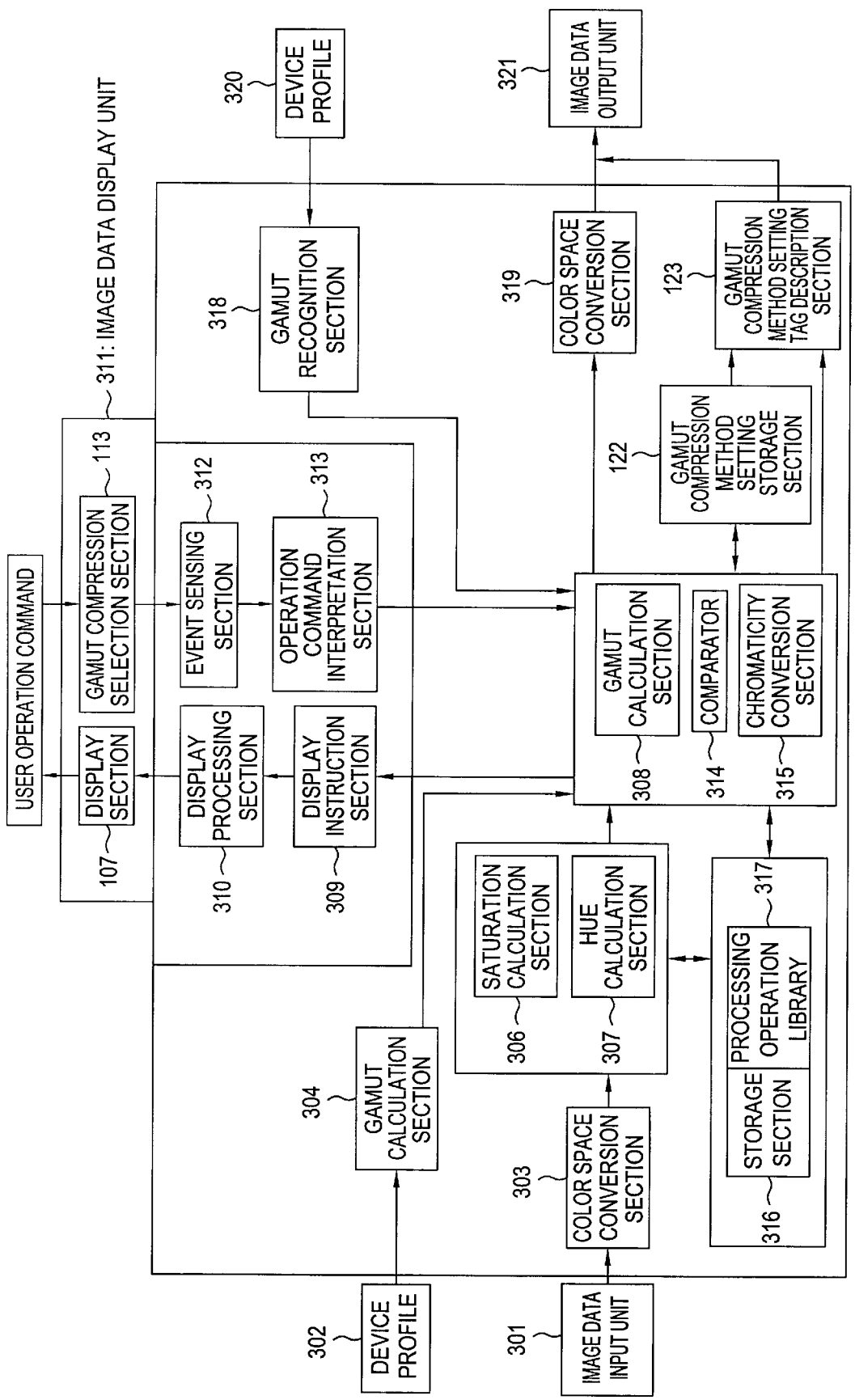
FIG. 19 is a block diagram showing the module configuration of the second embodiment of the invention.

FIG. 19 shows the module configuration for performing the above-mentioned processing. Parts identical with those previously described with reference to FIG. 1 are denoted by the same reference numerals in FIG. 19. In this figure, numeral 122 is a gamut compression method setting storage section for storing a setting history of gamut compression methods specified through an operation command interpretation section 313. This history can be returned to a chromaticity conversion section 315 as required.

Numeral 123 is a gamut compression method setting tag description section for adding the above-mentioned tag to image data output from a color space conversion section 319 to cause the image data output unit 321 to perform gamut compression. This tag contains information as to whether or not gamut compression is already applied to the image data. If gamut compression is not yet applied, the gamut compression method to be executed is read from the gamut compression method setting storage section 122 and is contained in the tag.

Figures 17, 18:
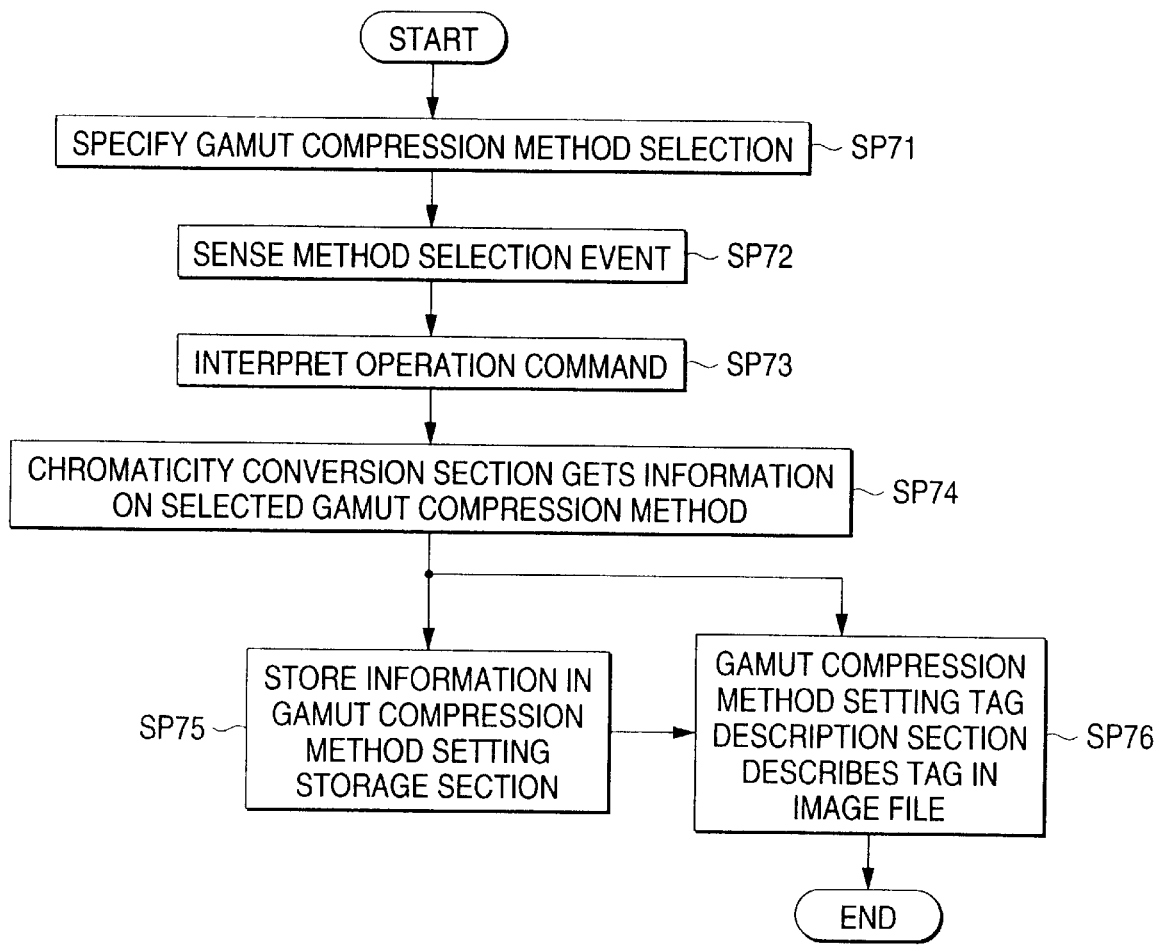
FIG. 17 is a flowchart of color conversion processing in a non-compression transmission mode in the second embodiment.
FIG. 18 is an illustration showing the contents stored in a gamut compression method setting storage section.

FIG. 18 shows the contents stored in the gamut compression method setting storage section 122. As shown here, the gamut compression method setting storage section 122 stores the number of gamut compression systems selected from among those of the common area storage type, saturation storage type, and relative lightness storage type, the selected gamut compression system types, and their mix percentage. B. Hardware configuration and operation of the embodiment The second embodiment has the same hardware configuration as the first embodiment except that a TRANSMISSION MODE button 505 as shown in FIG. 21 is provided so as to enable the user to specify whether or not gamut compression is to be previously applied to image data supplied to the image data output unit 321.

Figure 21:
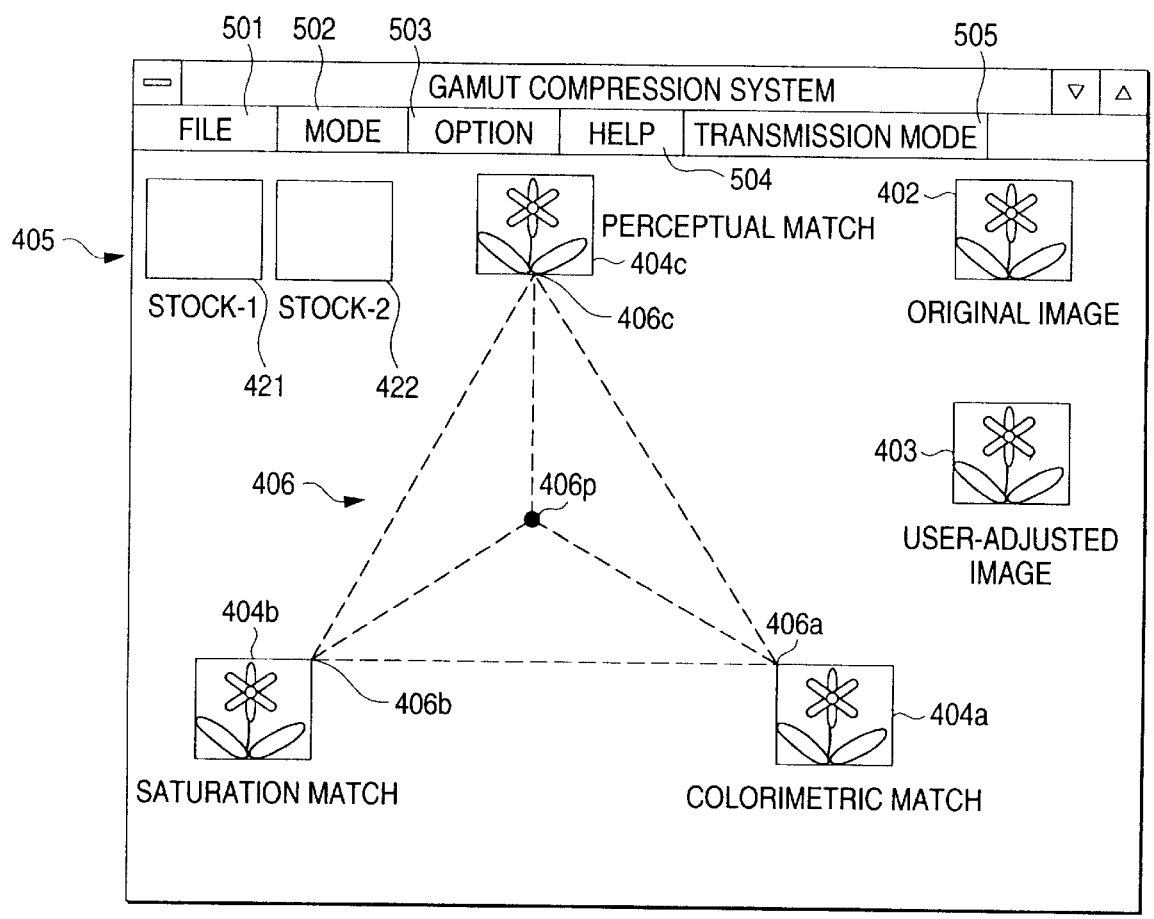
FIG. 21 is an illustration showing a display example of a display in the second embodiment of the invention.

FIG. 21 shows an example of adding the TRANSMISSION MODE button 505 to the window in FIG. 6; the button is also added to the windows corresponding to FIGS. 4, 8, and 9. When the user clicks on the TRANSMISSION MODE button 505, a list box consisting of character strings of ◊ TRANSMISSION AFTER GAMUT COMPRESSION and ◊ GAMUT COMPRESSION AFTER TRANSMISSION is displayed below the TRANSMISSION MODE button 505.

The user can click on the ◊ mark in the desired character string as with handling the OPTIONS button 503, etc., for selecting the transmission mode. The transmission mode of ◊ TRANSMISSION AFTER GAMUT COMPRESSION, which will be hereinafter referred to as the compression transmission mode, is to perform the same operation as in the first embodiment; the transmission mode of ◊ GAMUT COMPRESSION AFTER TRANSMISSION, which will be hereinafter referred to as the non-compression transmission mode, is a mode in which the image data output unit 321 performs gamut compression.

Figure 11:
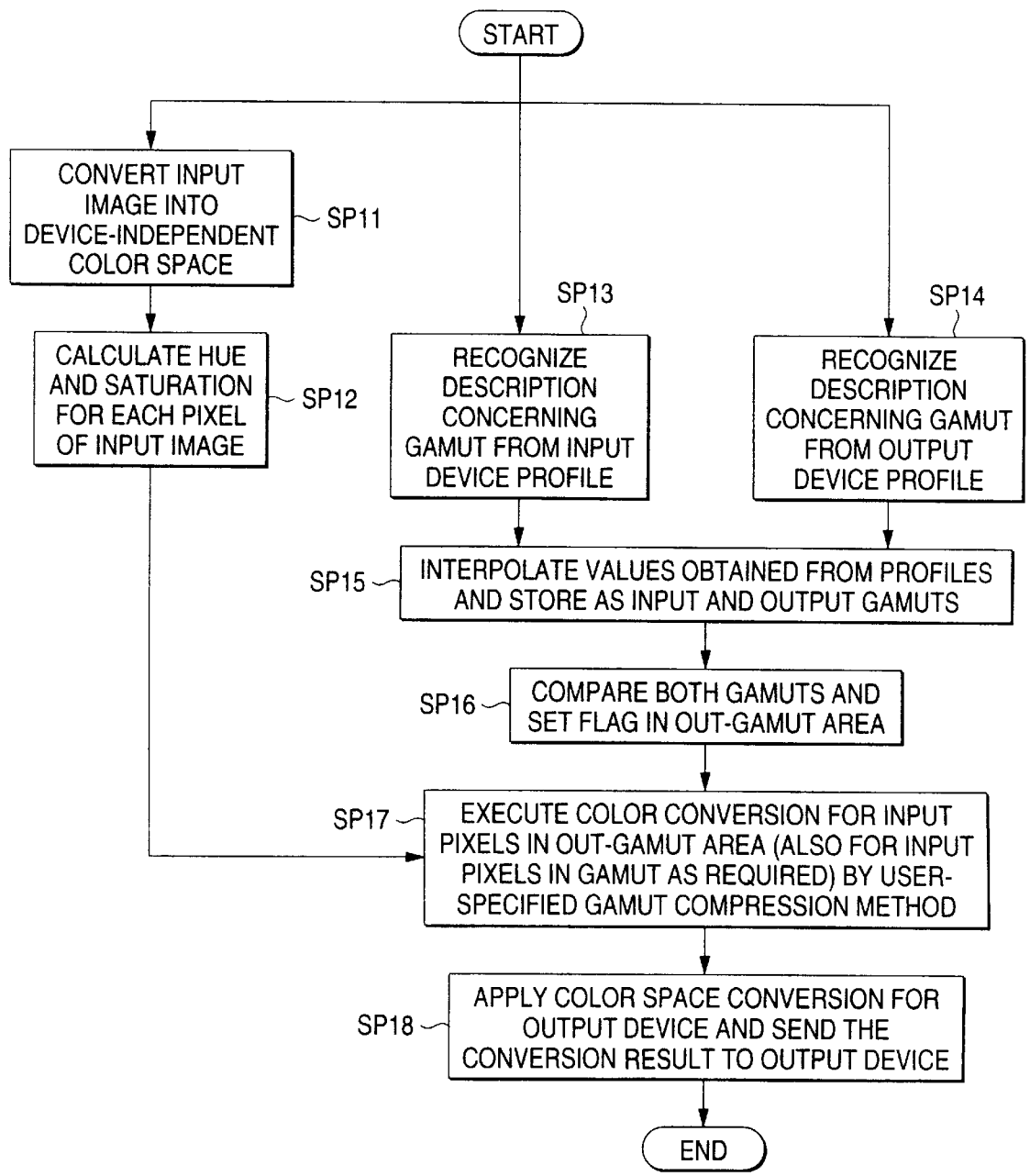
FIG. 11 is a flowchart of color conversion processing in a compression transmission mode in a second embodiment.

The color conversion operation in the compression transmission mode will be discussed with reference to FIG. 11. In the figure, when control goes to step SP11, a color space conversion section 303 converts input image data into a device-independent color space. Next, when control goes to step SP12, a saturation calculation section 306 and a hue calculation section 307 calculate the hue and saturation for each pixel of the input image data.

Steps SP13–SP16 are executed in parallel with step SP12. First at step SP13, a gamut recognition section 304 recognizes the description concerning the gamut in an input device profile. On the other hand, at step SP14, a gamut recognition section 318 recognizes the description concerning the gamut in an output device profile.

When control goes to step SP15, the gamut recognition section 318 interpolates the values obtained from the device profiles and recognizes the interpolated values as input gamut GIN and output gamut GOUT. When control goes to step SP16, a comparator 314 compares both the gamuts and sets a flag in an out-gamut area of the output gamut GOUT.

When control goes to step SP17, the chromaticity conversion section 315 performs color conversion processing for the input pixels belonging to the out-gamut area (also for the input pixels in the gamut as required) based on the gamut compression method specified by the user.

The conversion processing contents are stored in the gamut compression method setting storage section 122 in sequence and can be restored based on a command entered by the user. When control goes to step SP18, the color space conversion section 319 converts the compressed image data color space into a color space for the output device and outputs the conversion result to the image data output unit 321.

Next, FIG. 17 shows processing performed when the non-compression transmission mode is applied. In the figure, when control goes to SP71, a gamut compression method is selected as in the first embodiment. When a method selection event is sensed at step SP72, control goes to step SP73 and the operation command is interpreted. Next, when control goes to step SP74, the chromaticity conversion section 315 gets information on the selected gamut compression method.

When control goes to step SP75, the gotten gamut compression method is stored in the gamut compression method setting storage section 122. When control goes to step SP76, the gamut compression method setting tag description section 123 adds a tag describing the gamut compression method to the image data and the tag added to the image data is output through the color space conversion section 319 to the image data output unit 321.

Thus, to apply the non-compression transmission mode, the image data itself is not compressed and the compression method to be applied is read from the gamut compression method setting storage section 122 and the gamut compression method setting tag description section 123 adds a tag describing the compression method to the output image data, thus enabling the image data output unit 321 to perform gamut compression processing.

Third embodiment

A. Outline of the embodiment

Next, a third embodiment of the invention will be discussed. In the first and second embodiments we have discussed, the gamut compression contents are determined based on the input device profile 302 and the output device profile 320.

Figure 16A:
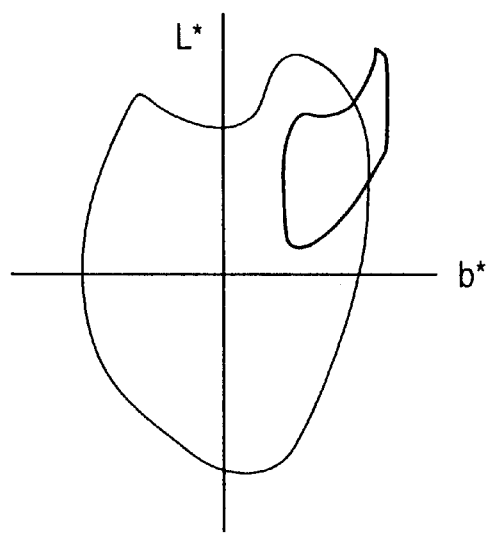
FIGS. 16A and 16B are illustrations showing an example of pixel values distributed over a part of input gamut GIN.
Figure 16B:
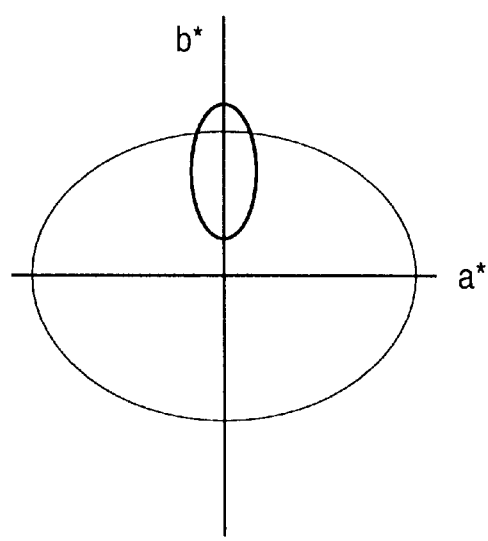

However, the pixel values of image data input from the image data input unit 301 are not necessarily distributed over all the range of input gamut GIN of the image data input unit 301 and may be often distributed only in a part. FIGS. 16A and 16B show an example of such an input gamut.

In such a case, gamut compression needs only to be executed so that the gamut of the image data itself lies within the range of output gamut GOUT, whereby degradation of the image data can be suppressed. Focusing attention on this point, the third embodiment is intended to detect the gamut of input image data for executing necessary and sufficient gamut compression.

Figure 20:
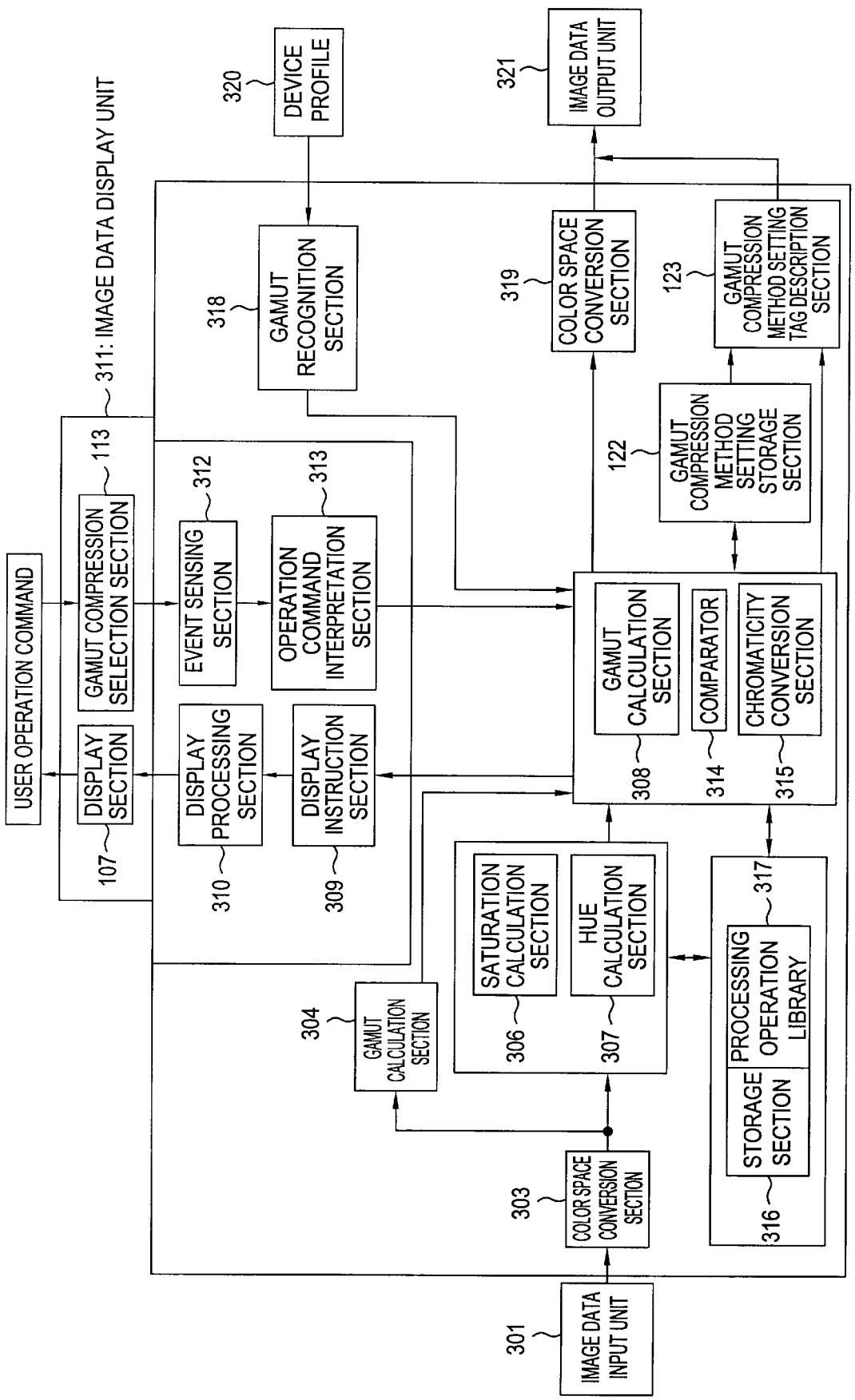
FIG. 20 is a block diagram showing the module configuration of the third embodiment of the invention.

FIG. 20 shows the module configuration for performing the processing described above. Parts identical with those previously described with reference to FIG. 1 or 19 are denoted by the same reference numerals in FIG. 20. In this figure, numeral 104 is a gamut recognition section for recognizing the gamut of input image data based on the data. Other components are the same as those in FIG. 19.

B. Hardware configuration and operation of the embodiment

The third embodiment differs from the second embodiment in input image data gamut recognition system, but is the same as the second embodiment in processing applied to the recognized gamut. Therefore, the first embodiment has the same hardware configuration as the second embodiment except for the parts related to the gamut recognition section 304.

Figure 12:
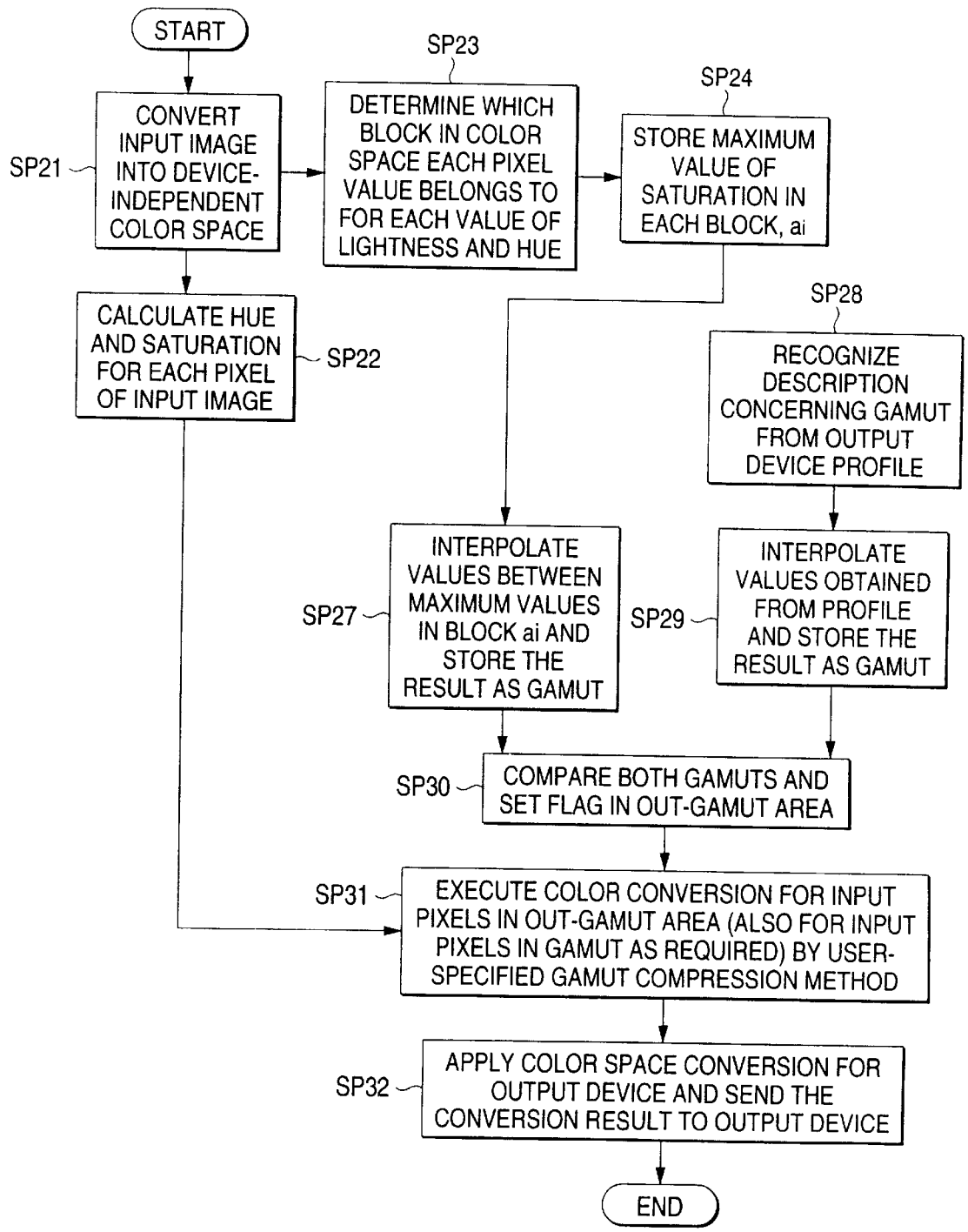
FIG. 12 is a flowchart of color conversion processing in a compression transmission mode in a third embodiment.

Processing performed when the compression transmission mode is applied in the third embodiment will be discussed with reference to FIG. 12. In the figure, when control goes to step SP21, a color space conversion section 303 converts input image data into a device-independent color space. Next, when control goes to step SP22, a saturation calculation section 306 and a hue calculation section 307 calculate the hue and saturation for each pixel of the input image data.

Steps SP23–SP30 are executed in parallel with step SP22. First at step SP23, it is assumed that L*a*b* color space is divided into blocks, and which block each pixel value belongs to is determined for each value of lightness and hue.

When control goes to step SP24, the gamut recognition section 104 stores the maximum value of the saturation in each block (maximum saturation in block, ai). Specifically, the maximum saturation in block, ai, is determined as follows:

When the first pixel value belonging to the target block is supplied, its saturation is stored as the maximum saturation in block, ai;

when a new pixel value is supplied, whether or not its saturation exceeds the maximum saturation in block, ai, is determined. If the saturation exceeds the maximum saturation, the saturation of the new pixel value is set as the maximum saturation in block, ai; and step is repeated. Upon completion of Step for all pixel values, the final maximum value in block, ai, is left.

When control goes to step SP27, the values between the maximum saturations in block, ai, between blocks are interpolated and the interpolation result is stored in the gamut recognition section 104 as input gamut GIN. On the other hand, at step SP28, a gamut recognition section 318 recognizes description concerning the gamut in an output device profile 320. When control goes to step SP29, the recognized description is interpolated and the interpolation result is stored as output gamut GOUT.

Next, when control goes to step SP30, a gamut calculation section 308 compares the input gamut GIN with the output gamut GOUT and sets a flag for the portion of the input gamut GIN outside the output gamut GOUT. When control goes to step SP31, a chromaticity conversion section 315 performs color conversion processing for the input pixels belonging to the out-gamut area (also for the input pixels in the gamut as required) based on the gamut compression method specified by the user.

The conversion processing contents are stored in a gamut compression method setting storage section 122 in sequence and can be restored based on a command entered by the user. When control goes to step SP32, a color space conversion section 319 converts the compressed image data color space into a color space for the output device and outputs the conversion result to an image data output unit 321.

To apply the non-compression transmission mode, step SP31 is changed. That is, at the step, gamut compression of the image data itself is not executed and the compression method to be applied is read from the gamut compression method setting storage section 122 and is added to output image data by a gamut compression method setting tag description section 123.

D. Modifications

The invention is not limited to the embodiments described above; for example, the following modifications are possible:

D-1. The gamut compression systems used with the embodiments are of the common area storage type, saturation storage type, and relative lightness storage type, but any other gamut compression systems may be used. In the embodiments, the number of gamut compression systems to be mixed is three, but four or more gamut compression systems may be mixed, needless to say.

D-2. In the embodiments, an image read from the hard disk 4 is displayed intact (or with pixels thinned out properly) as the original image 402, but the out-gamut area may be blink-displayed, etc., in the original image 402.

As we have discussed, according to the invention, the user can determine gamut adjustment means or mix level while seeing and comparing two or more conversion image data pieces or mixing them properly and easily specify an appropriate gamut compression system.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image processing system comprising:

means for inputting image data formed by a device;

first recognition means for recognizing a gamut in a device-independent color space, related to the image data input through said image data input means;

second recognition means for recognizing a gamut in a device-independent color space of an output device for outputting the image data;

a plurality of gamut adjustment means for applying gamut adjustments to the image data based on the gamuts recognized by said first and second recognition means;

display means for displaying a plurality of conversion image data pieces to which the gamut adjustments are applied by said gamut adjustment means, and for displaying said image data to which no gamut adjustments are applied; and means for selecting specific gamut adjustment means from among said plurality of gamut adjustment means based on said plurality of conversion image data pieces displayed by said display means.

2. The image processing system as claimed in claim 1 wherein the gamut in the device-independent color space, related to the image data recognized by said first recognition means is a gamut in the device-independent color of space the device.

3. The image processing system as claimed in claim 1 wherein the gamut in the device-independent color space, related to the image data recognized by said first recognition means is a gamut in the device-independent color space of the image data.

4. The image processing system as claimed in claim 1 further including means for displaying on said display means an out-gamut area distinguishably from other areas for the image data to which no gamut adjustments are applied.

5. The image processing system as claimed in claim 1 further including:

storage means for storing the gamut adjustment means selected through said selection means; and tag information addition means for adding contents of the gamut adjustment means stored in said storage means to the image data as tag information.

6. An image processing system comprising:

means for inputting image data formed by an input device;

first recognition means for recognizing a gamut of either the image data input through said image data input means or a gamut of the input device in a device-independent color space;

second recognition means for recognizing a gamut in a device-independent color space of an output device for inputting the image data;

means for applying gamut adjustments to the image data based on the gamuts recognized by said first and second recognition means; and display means for mixing color information contained in a plurality of conversion image data pieces to which the gamut adjustments are applied by said gamut adjustment means, and displaying resultant data.

7. The image processing system as claimed in claim 6 further including:

specification means for specifying a mix level of the color information contained in said plurality of conversion image data pieces to which the gamut adjustments are applied by said gamut adjustment means; and mixing means for mixing said plurality of conversion image data pieces to which the gamut adjustments are applied, based on a mix specification made through said specification means, wherein said display means mixes the color information based on the mixing performed by said mixing means and displays the resultant data.

8. The image processing system as claimed in claim 7 wherein said display means geometrically places a mix of the color information contained in said plurality of conversion image data pieces to which the gamut adjustments are applied, and displays a result.

9. The image processing system as claimed in claim 8 wherein said specification means is used to specify an arbitrary position on a display surface of said display means, further including means for determining the mix level based on coordinate positions of said plurality of conversion image data pieces geometrically placed and displayed by said display means and a position specified through said specification means.

10. The image processing system as claimed in claim 7 wherein said specification means is used to specify a plurality of mix levels, wherein said mixing means executes a plurality of mixing processes based on a plurality of mix levels specified through said specification means, and wherein said display means gradually displays a plurality of image data pieces provided by said mixing means executing a plurality of mixing processes in response to the mix levels.

11. The image processing system as claimed in claim 6 further including:

means for specifying a mix level of the color information contained in said plurality of conversion image data pieces to which the gamut adjustments are applied by said gamut adjustment means;

means for storing information of the mix level specified through said specification means; and tag information addition means for adding the mix level specification information stored in said storage means to the image data as tag information.

12. A gamut adjustment method comprising the steps of:

recognizing an input gamut in a device-independent color space, related to input image data;

recognizing an output gamut in a device-independent color space of an output device for outputting the image data;

applying gamut adjustments to the image data based on the recognized input and output gamuts;

displaying a plurality of conversion image data pieces to which the gamut adjustments are applied and said image data to which no gamut adjustments are applied; and selecting specific gamut adjustment based on said plurality of conversion image data pieces displayed.

13. The gamut adjustment method as claimed in claim 12 wherein the input gamut recognized is a gamut in the device-independent color space of an input device.

14. The gamut adjustment method as claimed in claim 12 wherein the input gamut recognized is a gamut in the device-independent color space of the image data itself has.

15. The gamut adjustment method as claimed in claim 12 further comprising the step of displaying an out-gamut area distinguishably from other areas for displayed image data to which no gamut adjustments are applied.

16. The gamut adjustment method as claimed in claim 12 further comprising the steps of:

storing the selected gamut adjustment; and adding contents of the stored gamut adjustment to the image data as tag information.

17. A gamut adjustment method comprising the steps of:

recognizing an input gamut of either input image data or a gamut of an input device in a device-independent color space;

recognizing an output gamut in a device-independent color space of an output device for outputting the image data;

applying gamut adjustments to the image data based on the recognized input and output gamuts;

specifying a mix level of color information contained in a plurality of conversion image data pieces to which the gamut adjustments are applied;

mixing said plurality of conversion image data pieces to which the gamut adjustments are applied, based on the mix level specification; and displaying the color information resulting from the mixing step.

18. The gamut adjustment method as claimed in claim 17 further comprising geometrically displaying a mix of the color information contained in said plurality of conversion image data pieces to which the gamut adjustments are applied.

19. The gamut adjustment method as claimed in claim 18 further comprising the steps of:

specifying an arbitrary position on a display surface of the color information resulting from the mixing step; and determining the mix level based on the specified position and coordinate positions of said plurality of conversion image data pieces geometrically placed and displayed.

20. The gamut adjustment method as claimed in claim 17 wherein said mix level specification is made for a plurality of mix levels, wherein a plurality of mixing processes is executed based on said plurality of mix level specifications, and wherein said color information display gradually displays a plurality of image data pieces provided by executing said plurality of mixing processes in response to the mix levels.

21. The gamut adjustment method as claimed in claim 17 further comprising the steps of:

storing the specified color information mix level; and adding the stored mix level specification information to the image data as tag information.

22. An image processing system comprising:

means for inputting image data formed by an input device;

first recognition means for recognizing a gamut of the image data input through said image data input means or a gamut of the input device in a device-independent color space;

second recognition means for recognizing a gamut in a device-independent color space of an output device for outputting the image data;

a plurality of gamut adjustment means for applying gamut adjustments to the image data based on the gamuts recognized by said first and second recognition means;

display means for displaying a plurality of conversion image data pieces to which the gamut adjustments are applied by said gamut adjustment means; and means for selecting specific gamut adjustment means from among said plurality of gamut adjustment means based on said plurality of conversion image data pieces displayed by said display means.

23. A gamut adjustment method comprising the steps of:

recognizing an input gamut of input image data or a gamut of an input device in a device-independent color space;

recognizing an output gamut in a device-independent color space of an output device for outputting the image data;

applying gamut adjustments to the image data based on the recognized input and output gamuts;

displaying a plurality of conversion image data pieces to which the gamut adjustments are applied; and selecting specific gamut adjustment based on said plurality of conversion image data pieces displayed.

* * * * *